US009232518B2

(12) United States Patent
Monzen et al.

(10) Patent No.: US 9,232,518 B2
(45) Date of Patent: Jan. 5, 2016

(54) BASE STATION AND COMMUNICATION CONTROL METHOD

(71) Applicant: KYOCERA Corporation, Kyoto-shi, Kyoto (JP)

(72) Inventors: Maimi Monzen, Yokohama (JP); Masashi Iwami, Ogaki (JP)

(73) Assignee: KYOCERA Corporation, Kyoto (JP)

( * ) Notice: Subject to any disclaimer, the term of this patent is extended or adjusted under 35 U.S.C. 154(b) by 104 days.

(21) Appl. No.: 14/348,567

(22) PCT Filed: Sep. 27, 2012

(86) PCT No.: PCT/JP2012/074828
§ 371 (c)(1),
(2) Date: Mar. 28, 2014

(87) PCT Pub. No.: WO2013/047636
PCT Pub. Date: Apr. 4, 2013

(65) Prior Publication Data
US 2014/0247797 A1    Sep. 4, 2014

(30) Foreign Application Priority Data
Sep. 28, 2011    (JP) .................................. 2011-212975

(51) Int. Cl.
*H04W 72/04*        (2009.01)
*H04L 5/00*         (2006.01)
(Continued)

(52) U.S. Cl.
CPC ........... *H04W 72/042* (2013.01); *H04L 1/0015* (2013.01); *H04L 1/06* (2013.01); *H04L 5/0092* (2013.01); *H04W 72/085* (2013.01); *H04W 72/046* (2013.01)

(58) Field of Classification Search
CPC ............ H04W 72/042; H04W 72/085; H04W 72/046; H04L 5/0092; H04L 1/0015; H04L 1/06
See application file for complete search history.

(56) References Cited

U.S. PATENT DOCUMENTS 8,041,395 B2 * 10/2011 Lo .......................... H01Q 25/00
                                                   455/562.1
8,068,875 B2    11/2011 Nagai
(Continued)

FOREIGN PATENT DOCUMENTS

JP    2006-314009 A    11/2006
JP    2008-011505 A    1/2008
WO    2006/077842 A1    7/2006

OTHER PUBLICATIONS

International Search Report dated Dec. 18, 2012, issued for International Application No. PCT/JP2012/074828.
(Continued)

*Primary Examiner* — Brian D Nguyen
(74) *Attorney, Agent, or Firm* — Procopio, Cory, Hargreaves & Savitch LLP

(57) ABSTRACT

A communication section controls the transmission directivity of a plurality of antennas, based on a known signal transmitted from a communication terminal. A radio resource allocating section allocates a downlink radio resource and allocates an uplink radio resource. A grouping processing section for classifying classifies a plurality of communication terminals with which the communication section communicates into a first terminal group executing an application with high communication quality of transfer data and a second terminal group executing an application with low communication quality of transfer data. A unit period is determined in which an uplink radio resource for a known signal usable for the transmission of the known signal by a communication terminal and a downlink radio resource appear. A correspondence between the downlink radio resource and the uplink radio resource for the known signal is defined for null steering based on the known signal in the unit period.

15 Claims, 21 Drawing Sheets

(51) Int. Cl.
*H04L 1/00* (2006.01)
*H04L 1/06* (2006.01)
*H04W 72/08* (2009.01)

(56) References Cited

U.S. PATENT DOCUMENTS

| | | | |
|---|---|---|---|
| 8,477,754 B2 | 7/2013 | Kakura | |
| 2003/0128658 A1* | 7/2003 | Walton | H04L 1/06 370/208 |
| 2006/0268767 A1 | 11/2006 | Sato et al. | |
| 2010/0035542 A1* | 2/2010 | Fujishima | H04B 7/1555 455/10 |
| 2010/0086070 A1* | 4/2010 | Ishii | H04B 7/0814 375/260 |
| 2010/0296477 A1* | 11/2010 | Hason | H04W 16/12 370/330 |
| 2010/0303034 A1* | 12/2010 | Chen | H04L 5/0023 370/329 |
| 2011/0286436 A1* | 11/2011 | Suzuki | H04L 1/1692 370/336 |

OTHER PUBLICATIONS

ZTE, Considerations on Dual-layer Beamforming, 3GPP TSG RAN WG1 meeting #56bis R-1091434, Mar. 23, 2009, Seoul, Korea.
3GPP TS 36.211, V10.2.0, 3rd Generation Partnership Project; Technical Specification Group Radio Access Network; Evolved Universal Terrestrial Radio Access (E-UTRA); Physical Channels and Modulation (Release 10), Jun. 2011, pp. 10-11, 80-85, Valbonne, France.
International Preliminary Report on Patentability and Written Opinion of the International Searching Authority issued by the International Bureau for International Application No. PCT/JP2012/074828.

* cited by examiner

F I G. 7
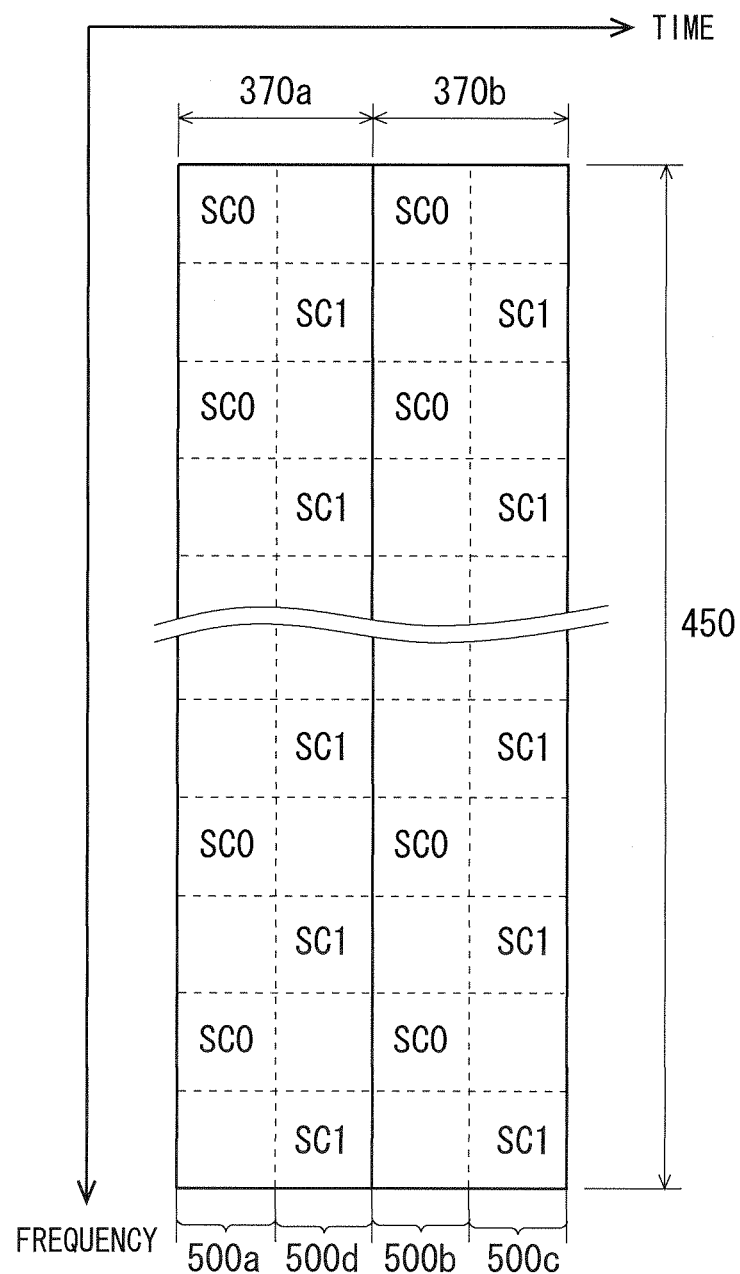

F I G. 1 4

| | APPLICATION | ALLOWABLE DELAY TIME | ALLOWABLE ERROR RATE |
|---|---|---|---|
| HIGH QoS | VoIP | 100ms | $10^{-2}$ |
| | Game | 50ms | $10^{-3}$ |
| | Video | 150ms | $10^{-3}$ |
| LOW QoS | HTTP | 300ms | $10^{-6}$ |
| | FTP | 300ms | $10^{-6}$ |

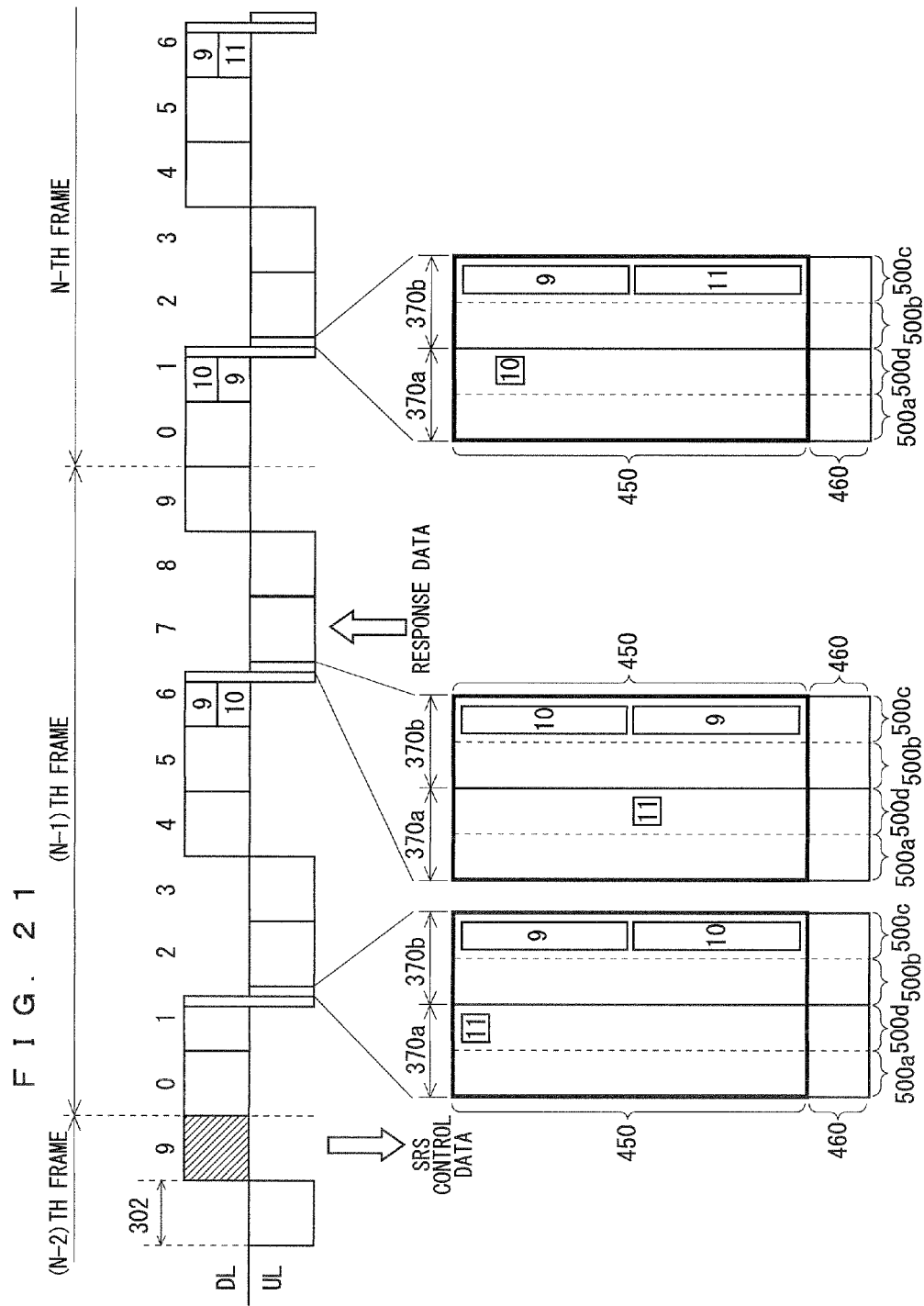

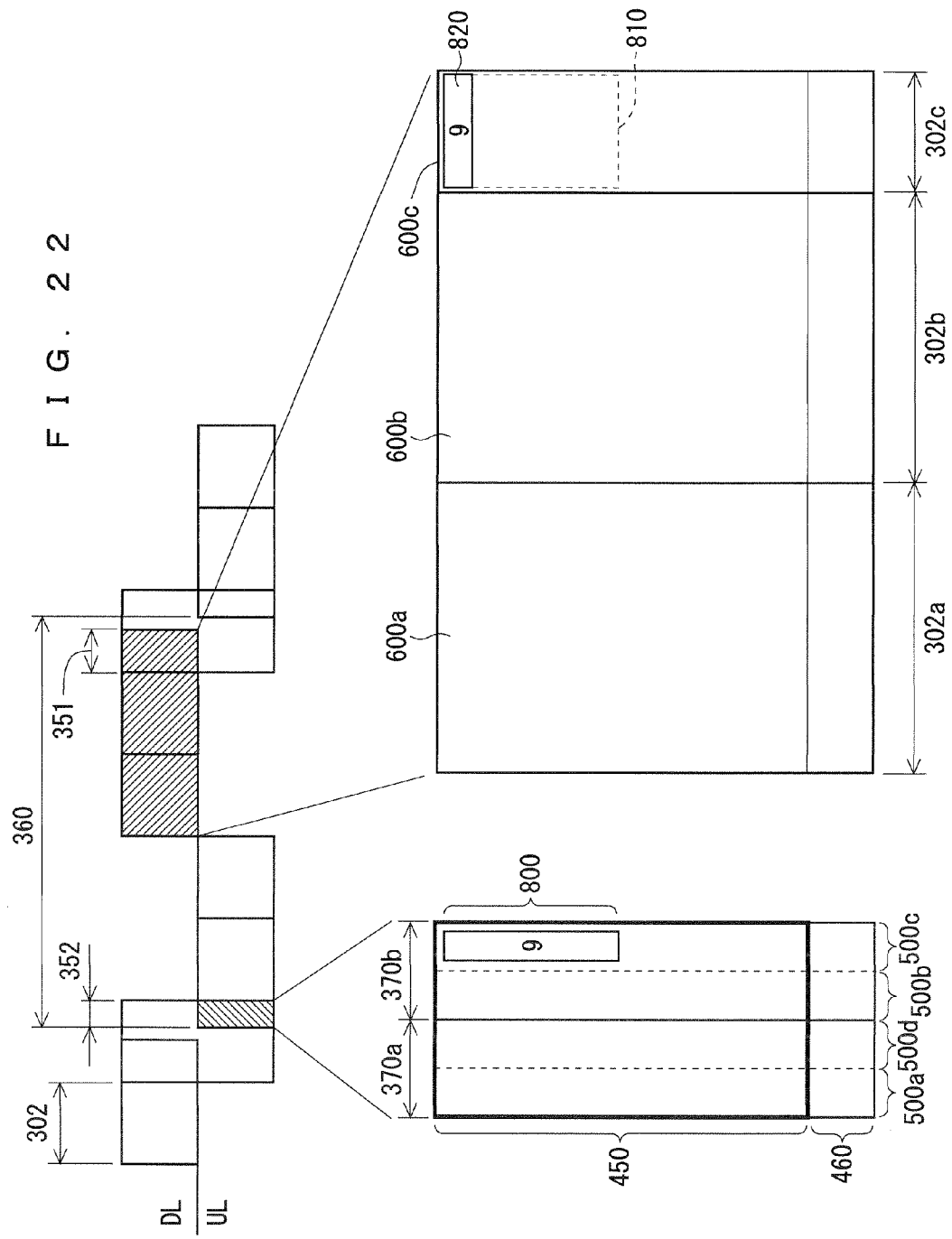

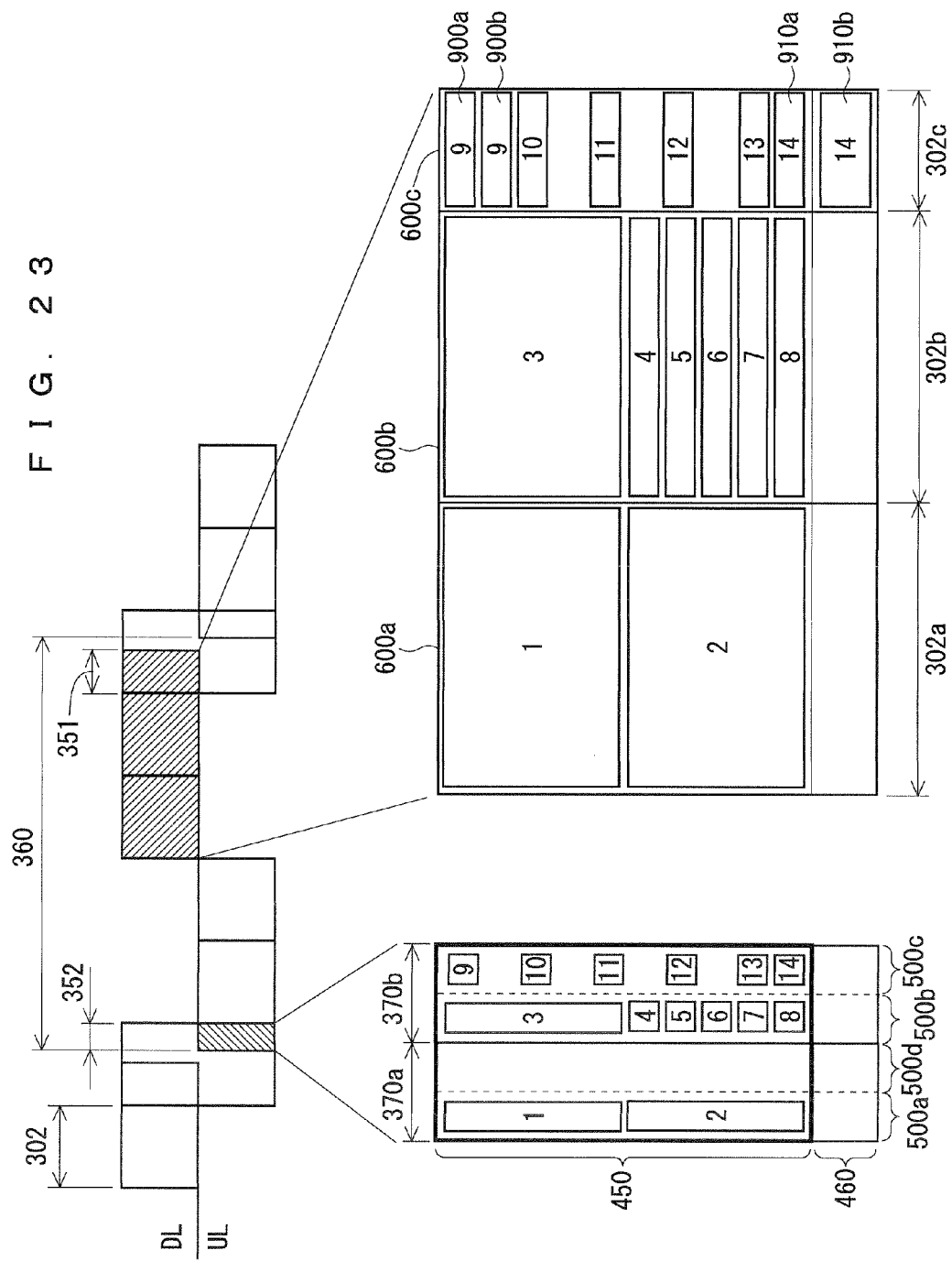

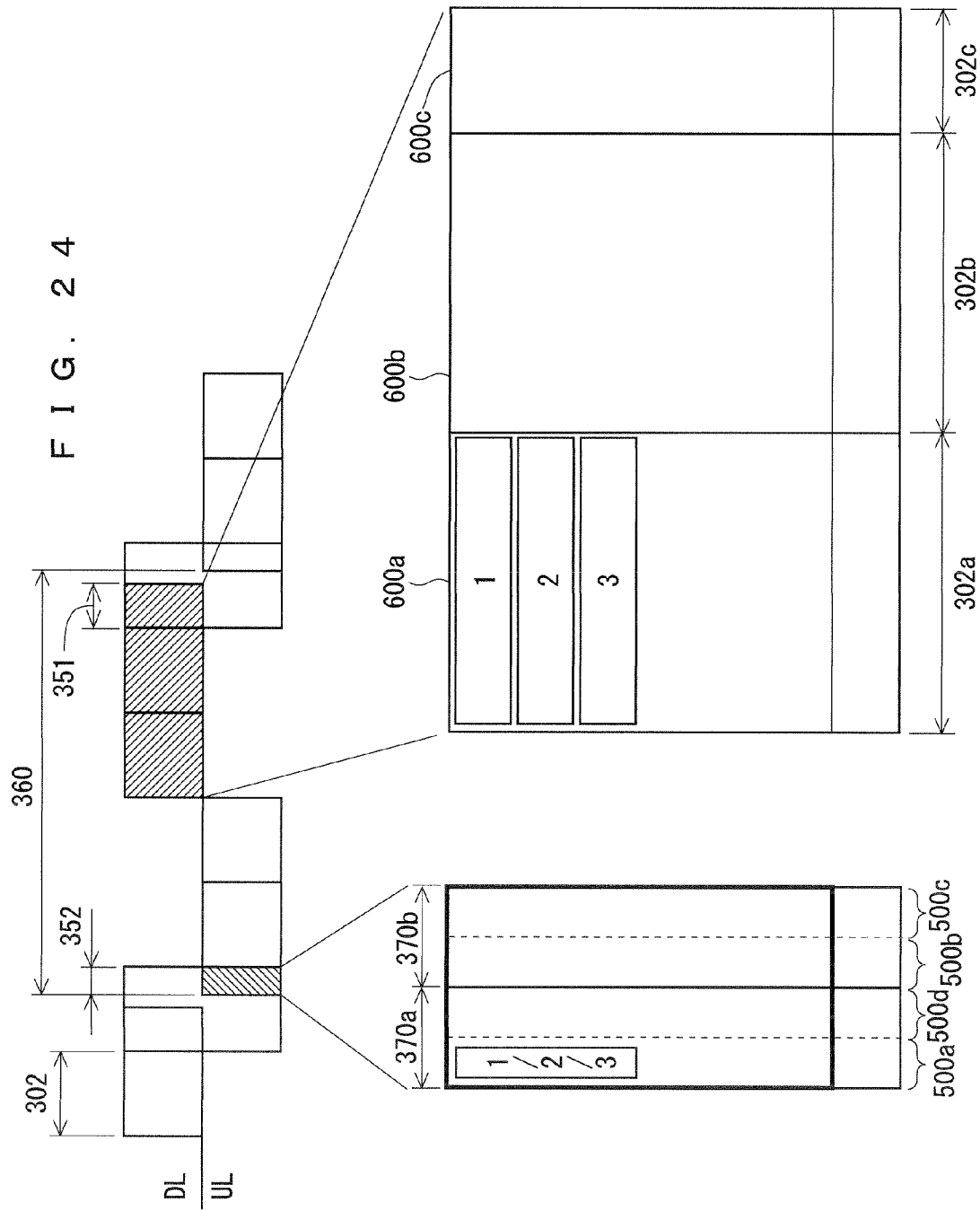

BASE STATION AND COMMUNICATION CONTROL METHOD

TECHNICAL FIELD

The present invention relates to a base station which controls the transmission directivity of a plurality of antennas.

BACKGROUND ART

A variety of techniques related to radio communication have been hitherto proposed. A technique related to a radio communications system including base stations and communication terminals is disclosed in Patent Literature 1, for example.

CITATION LIST

Patent Literature

Patent Literature 1: International Publication No. 2006/077842 pamphlet

SUMMARY OF INVENTION

Technical Problem

As described in Patent Literature 1, there are cases where a base station controls the transmission directivity of a plurality of antennas to perform downlink communication with communication terminals.

On the other hand, an improvement in performance of the base station is desired.

In view of the foregoing, it is an object of the present invention to provide a technique capable of improving the performance of a base station which controls the transmission directivity of a plurality of antennas.

Solution to Problem

A base station according to one aspect of the present invention comprises: a communication section for performing communication using a plurality of antennas, the communication section controlling the transmission directivity of the plurality of antennas, based on a known signal transmitted from a communication terminal, when performing downlink communication; a radio resource allocating section for allocating a downlink radio resource used for the transmission of a signal to a communication terminal by the communication section to the communication terminal and for allocating an uplink radio resource used for the transmission of the known signal by a communication terminal to the communication terminal; and a grouping processing section for classifying a plurality of communication terminals with which the communication section communicates into a first terminal group executing an application which is short in allowable delay time of transfer data and a second terminal group executing an application which is long in allowable delay time of transfer data, wherein a unit period is determined in which an uplink radio resource for a known signal usable for the transmission of the known signal by a communication terminal and a downlink radio resource appear, wherein a correspondence between the downlink radio resource and the uplink radio resource for the known signal is defined for null steering based on the known signal in the unit period, wherein the uplink radio resource for the known signal includes an uplink radio resource for a first terminal used by the first terminal group and an uplink radio resource for a second terminal used by the second terminal group, and wherein the number of communication terminals in the first terminal group capable of transmitting the known signal using the uplink radio resource for the first terminal is greater than the number of communication terminals in the second terminal group capable of transmitting the known signal using the uplink radio resource for the second terminal in the unit period.

A base station according to another aspect of the present invention comprises: a communication section for performing communication using a plurality of antennas, the communication section controlling the transmission directivity of the plurality of antennas, based on a known signal transmitted from a communication terminal, when performing downlink communication; a radio resource allocating section for allocating a downlink radio resource used for the transmission of a signal to a communication terminal by the communication section to the communication terminal and for allocating an uplink radio resource used for the transmission of the known signal by a communication terminal to the communication terminal; and a grouping processing section for classifying a plurality of communication terminals with which the communication section communicates into a first terminal group executing an application which is small in the amount of transfer data and a second terminal group executing an application which is large in the amount of transfer data, wherein a unit period is determined in which an uplink radio resource for a known signal usable for the transmission of the known signal by a communication terminal and a downlink radio resource appear, wherein a correspondence between the downlink radio resource and the uplink radio resource for the known signal is defined for null steering based on the known signal in the unit period, and wherein the radio resource allocating section makes the transmission frequency bandwidth of the known signal transmitted from a communication terminal in the first terminal group smaller than the transmission frequency bandwidth of the known signal transmitted from a communication terminal in the second terminal group.

A base station according to another aspect of the present invention comprises: a communication section for performing communication using a plurality of antennas, the communication section controlling the transmission directivity of the plurality of antennas, based on a known signal transmitted from a communication terminal, when performing downlink communication; a radio resource allocating section for allocating a downlink radio resource used for the transmission of a signal to a communication terminal by the communication section to the communication terminal and for allocating an uplink radio resource used for the transmission of the known signal by a communication terminal to the communication terminal; and a grouping processing section for classifying a plurality of communication terminals with which the communication section communicates into a first terminal group executing an application which is high in allowable error rate of transfer data and a second terminal group executing an application which is low in allowable error rate of transfer data, wherein a unit period is determined in which an uplink radio resource for a known signal usable for the transmission of the known signal by a communication terminal and a downlink radio resource appear, wherein a correspondence between the downlink radio resource and the uplink radio resource for the known signal is defined for null steering based on the known signal in the unit period, wherein the radio resource allocating section sometimes allocates a corresponding downlink radio resource brought into correspondence with an uplink radio resource which a communication terminal in the first terminal group uses for the transmission of the known signal and a non-corresponding downlink radio resource not brought into correspondence with the uplink radio resource to the communication terminal, and wherein the radio resource allocating section allocates only a downlink radio resource brought into correspondence with an uplink radio resource which a communication terminal in the second terminal group uses for the transmission of the known signal to the communication terminal.

A method of communication control according to one aspect of the present invention is a method of communication control in a base station communicating with a communication terminal. The method comprises the steps of: (a) performing communication using a plurality of antennas, and controlling the transmission directivity of the plurality of antennas, based on a known signal transmitted from a communication terminal, when performing downlink communication; (b) allocating a downlink radio resource used for the transmission of a signal to a communication terminal in the step (a) to the communication terminal, and allocating an uplink radio resource used for the transmission of the known signal by a communication terminal to the communication terminal; and (c) classifying a plurality of communication terminals with which communication is performed in the step (a) into a first terminal group executing an application which is short in allowable delay time of transfer data and a second terminal group executing an application which is long in allowable delay time of transfer data, wherein a unit period is determined in which an uplink radio resource for a known signal usable for the transmission of the known signal by a communication terminal and a downlink radio resource appear, wherein a correspondence between the downlink radio resource and the uplink radio resource for the known signal is defined for null steering based on the known signal in the unit period, wherein the uplink radio resource for the known signal includes an uplink radio resource for a first terminal used by the first terminal group and an uplink radio resource for a second terminal used by the second terminal group, and wherein the number of communication terminals in the first terminal group capable of transmitting the known signal using the uplink radio resource for the first terminal is greater than the number of communication terminals in the second terminal group capable of transmitting the known signal using the uplink radio resource for the second terminal in the unit period.

A method of communication control according to another aspect of the present invention is a method of communication control in a base station communicating with a communication terminal. The method comprises the steps of: (a) performing communication using a plurality of antennas, and controlling the transmission directivity of the plurality of antennas, based on a known signal transmitted from a communication terminal, when performing downlink communication; (b) allocating a downlink radio resource used for the transmission of a signal to a communication terminal in the step (a) to the communication terminal, and allocating an uplink radio resource used for the transmission of the known signal by a communication terminal to the communication terminal; and (c) classifying a plurality of communication terminals with which communication is performed in the step (a) into a first terminal group executing an application which is small in the amount of transfer data and a second terminal group executing an application which is large in the amount of transfer data, wherein a unit period is determined in which an uplink radio resource for a known signal usable for the transmission of the known signal by a communication terminal and a downlink radio resource appear, wherein a correspondence between the downlink radio resource and the uplink radio resource for the known signal is defined for null steering based on the known signal in the unit period, and wherein the transmission frequency bandwidth of the known signal transmitted from a communication terminal in the first terminal group is made smaller than the transmission frequency bandwidth of the known signal transmitted from a communication terminal in the second terminal group in the step (b).

A method of communication control according to another aspect of the present invention is a method of communication control in a base station communicating with a communication terminal. The method comprises the steps of: (a) performing communication using a plurality of antennas, and controlling the transmission directivity of the plurality of antennas, based on a known signal transmitted from a communication terminal, when performing downlink communication; (b) allocating a downlink radio resource used for the transmission of a signal to a communication terminal in the step (a) to the communication terminal, and allocating an uplink radio resource used for the transmission of the known signal by a communication terminal to the communication terminal; and (c) classifying a plurality of communication terminals with which communication is performed in the step (a) into a first terminal group executing an application which is high in allowable error rate of transfer data and a second terminal group executing an application which is low in allowable error rate of transfer data, wherein a unit period is determined in which an uplink radio resource for a known signal usable for the transmission of the known signal by a communication terminal and a downlink radio resource appear, wherein a correspondence between the downlink radio resource and the uplink radio resource for the known signal is defined for null steering based on the known signal in the unit period, wherein a corresponding downlink radio resource brought into correspondence with an uplink radio resource which a communication terminal in the first terminal group uses for the transmission of the known signal and a non-corresponding downlink radio resource not brought into correspondence with the uplink radio resource are sometimes allocated to the communication terminal in the step (b), and wherein only a downlink radio resource brought into correspondence with an uplink radio resource which a communication terminal in the second terminal group uses for the transmission of the known signal is allocated to the communication terminal in the step (b).

Advantageous Effects of Invention

According to the present invention, the performance of a base station which controls the transmission directivity of a plurality of antennas is improved.

These and other objects, features, aspects and advantages of the present invention will become more apparent from the following detailed description of the present invention when taken in conjunction with the accompanying drawings.

BRIEF DESCRIPTION OF DRAWINGS

FIG. 7 is a diagram showing uplink radio resources for SRS.

FIG. 14 is a table showing the allowable delay time and the allowable error rate of transfer data required in applications.

FIG. 21 is a diagram showing the operation of a comparable base station.

FIG. 22 is a diagram showing an example of the allocation of the use downlink radio resources to the communication terminals in the comparable base station.

FIG. 23 is a diagram showing an example of the allocation of the use downlink radio resources to the communication terminals in the base station according to the embodiment of the present invention.

FIG. 24 is a diagram showing an example of the allocation of the use downlink radio resources to the communication terminals in the base station according to the embodiment of the present invention.

DESCRIPTION OF EMBODIMENTS

Figure 1:
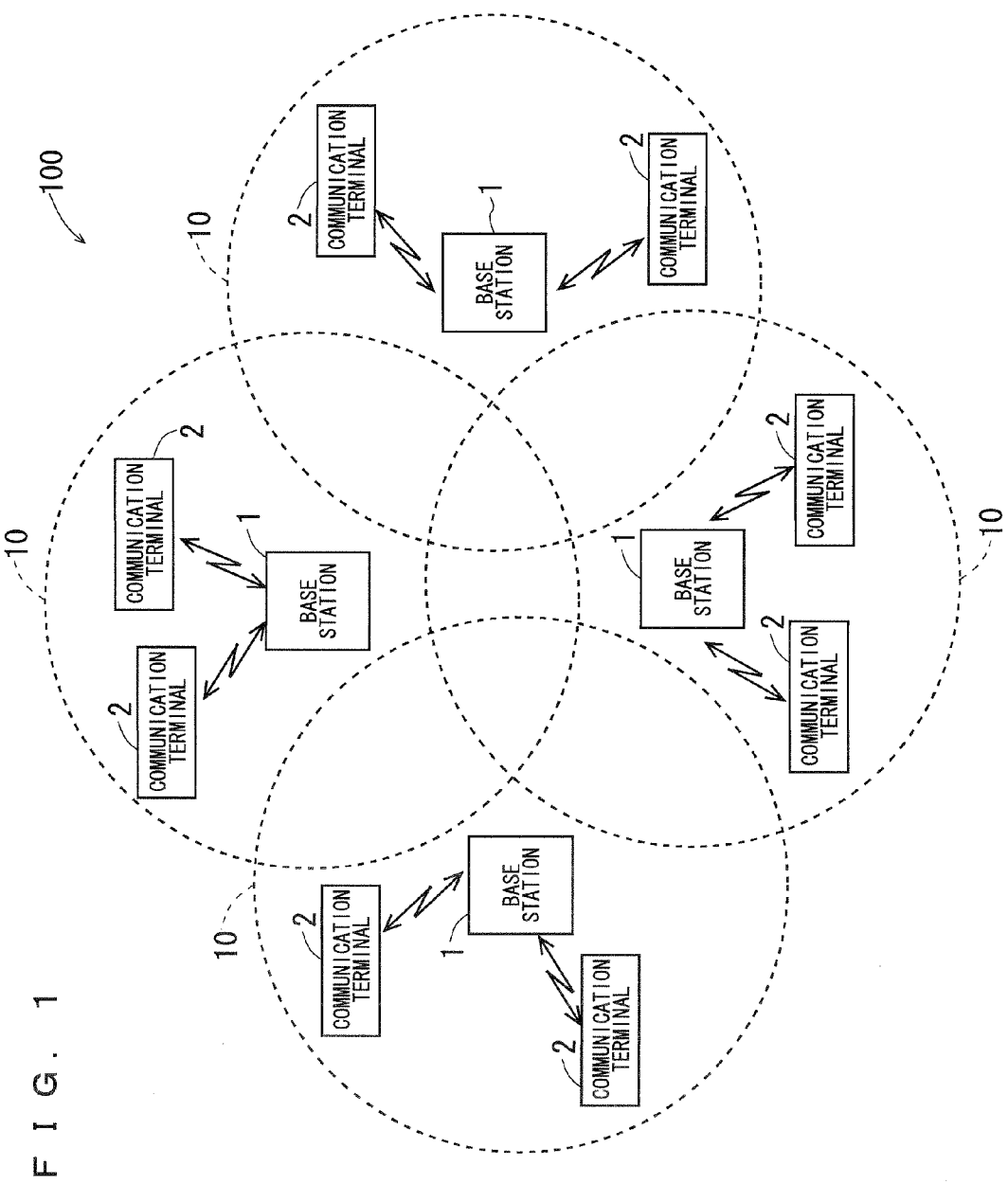
FIG. 1 is a diagram showing a configuration of a radio communications system.

FIG. 1 is a diagram showing a configuration of a radio communications system 100 including base stations 1 according to an embodiment of the present embodiment. The radio communications system 100 is, for example, LTE (Long Term Evolution) with a TDD (Time Division Duplexing) system adopted as a duplex system. LTE is referred to also as "E-UTRA".

The radio communications system 100 includes the plurality of base stations 1. Each of the base stations 1 communicates with a plurality of communication terminals 2. In LTE, an OFDMA (Orthogonal Frequency Division Multiple Access) system is used for downlink communication, and an SC-FDMA (Single Carrier-Frequency Division Multiple Access) system is used for uplink communication. An OFDM (Orthogonal Frequency Division Multiplexing) signal in which a plurality of subcarriers orthogonal to each other are combined together is used for communication between the base stations 1 and the communication terminals 2.

As shown in FIG. 1, each of the base stations 1 has a service area 10 which partially overlaps the service areas 10 of its neighboring base stations 1. In FIG. 1, there are only two or three neighboring base stations 1 for each of the base stations 1 because only four base stations 1 are shown. In actuality, however, there are six neighboring base stations 1, for example, for each of the base stations 1 in some cases.

The plurality of base stations 1 are connected to a network not shown. The plurality of base stations 1 are capable of communicating with each other via the network. A higher-level device such as a server device not shown is connected to the network. Each of the base stations 1 is capable of communicating with the higher-level device via the network.

Figure 2:
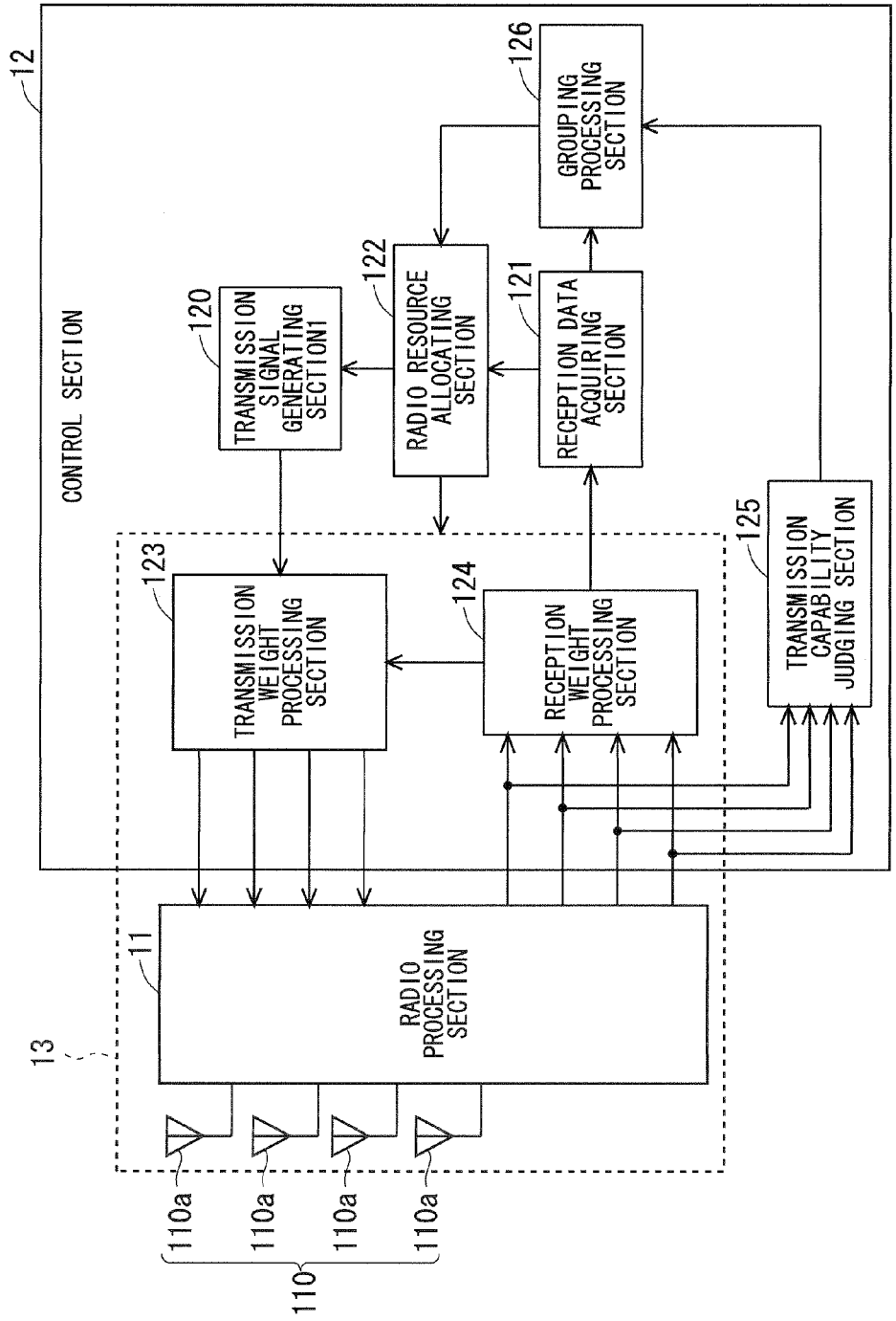
FIG. 2 is a diagram showing a configuration of a base station according to an embodiment of the present invention.

FIG. 2 is a diagram showing a configuration of each base station 1 according to the embodiment of the present invention. Such a base station 1 is capable of communicating with a plurality of communication terminals 2 at the same time by individually allocating radio resources identified by two-dimensions comprised of a time axis and a frequency axis to the communication terminals 2. The base station 1 includes an array antenna serving as transmitting and receiving antennas. The base station 1 is capable of controlling the directivity of the array antenna using an adaptive array antenna system.

As shown in FIG. 2, the base station 1 includes a radio processing section 11, and a control section 12 for controlling the radio processing section 11. The radio processing section 11 includes an array antenna 110 comprised of a plurality of antennas 110a. The radio processing section 11 performs an amplification process, down-converting, an A/D conversion process and the like on each of a plurality of reception signals received by the array antenna 110 to generate and output a plurality of baseband reception signals.

The radio processing section 11 also performs a D/A conversion process, up-converting, an amplification process and the like on each of a plurality of baseband transmission signals generated by the control section 12 to generate a plurality of carrier-band transmission signals. The radio processing section 11 then inputs the generated carrier-band transmission signals to the plurality of antennas 110a constituting the array antenna 110. Thus, the transmission signals are transmitted from the antennas 110a by radio.

The control section 12 includes a CPU (Central Processing Unit), a DSP (Digital Signal Processor), a memory and the like. In the control section 12, the CPU and the DSP execute various programs stored in the memory, so that a plurality of functional blocks are formed which include a transmission signal generating section 120, a reception data acquiring section 121, a radio resource allocating section 122, a transmission weight processing section 123, a reception weight processing section 124, a transmission capability judging section 125, a grouping processing section 126, and the like.

The transmission signal generating section 120 generates transmission data for transmission to the communication terminals 2. The transmission data includes control data and user data. Then, the transmission signal generating section 120 generates baseband transmission signals including the generated transmission data. The generated transmission signals are equal in number to the antennas 110a constituting the array antenna 110.

The transmission weight processing section 123 assigns a plurality of transmission weights for controlling the transmission directivity of the array antenna 110 respectively to the plurality of transmission signals generated in the transmission signal generating section 120. The transmission weight processing section 123 performs an inverse discrete Fourier transform (IDFT) and the like on the plurality of transmission signals to which the respective transmission weights are assigned, and thereafter outputs the plurality of transmission signals to the radio processing section 11.

The reception weight processing section 124 performs a discrete Fourier transform (DFT) on the plurality of reception signals inputted from the radio processing section 11, and thereafter assigns a plurality of reception weights for controlling the reception directivity of the array antenna 110 respectively to the plurality of reception signals. Then, the reception weight processing section 124 combines the plurality of reception signals to which the respective reception weights are assigned together to form a new reception signal (referred to hereinafter as a "combined reception signal").

The reception data acquiring section 121 performs an inverse discrete Fourier transform, a demodulation process and the like on the combined reception signal generated in the reception weight processing section 124 to acquire the control data and the user data included in the combined reception signal.

The radio processing section 11, the transmission weight processing section 123 and the reception weight processing section 124 in the base station 1 according to the present embodiment constitute a communication section 13 for communicating with the plurality of communication terminals 2 while adaptively controlling the directivity of the array antenna 110. When communicating with the communication terminals 2, the communication section 13 controls the reception directivity and the transmission directivity of the array antenna 110. Specifically, the communication section 13 adjusts the reception weights by which the reception signals are multiplied in the reception weight processing section 124 to thereby set the beam and null of the reception directivity of the array antenna 110 in various directions. Also, the communication section 13 adjusts the transmission weights by which the transmission signals are multiplied in the transmission weight processing section 123 to thereby set the beam and null of the transmission directivity of the array antenna 110 in various directions. The transmission weights may be determined from the reception weights. The reception weights may be determined based on known signals from the communication terminals 2.

The radio resource allocating section 122 determines a communication terminal 2 with which downlink communication of data is to be performed, and allocates a downlink radio resource (referred to hereinafter as a "use downlink radio resource") for use in the downlink communication of data with the communication terminal 2 to the communication terminal 2. The transmission signal generating section 120 generates a transmission signal including data to be transmitted to the communication terminal 2, based on the use downlink radio resource allocated to the communication terminal 2 by the radio resource allocating section 122, and inputs the transmission signal to the transmission weight processing section 123 at the time based on the use downlink radio resource. Thus, the transmission signal including the data to be transmitted to the communication terminal 2 is transmitted from the communication section 13 using the use downlink radio resource allocated to the communication terminal 2. The transmission signal generating section 120 generates and outputs a transmission signal including the control data for notifying the communication terminal 2 about the use downlink radio resource allocated to the communication terminal 2 by the radio resource allocating section 122. This allows the communication terminal 2 to know the use downlink radio resource for use in the transmission of data addressed to the communication terminal 2 itself. As a result, the communication terminal 2 receives the data addressed to the communication terminal 2 itself from the base station 1 appropriately.

The radio resource allocating section 122 also determines a communication terminal 2 with which uplink communication of data is to be performed, and allocates an uplink radio resource (referred to hereinafter as a "use uplink radio resource") for use in the uplink communication of data with the communication terminal 2 to the communication terminal 2. The transmission signal generating section 120 generates and outputs a transmission signal including control data for notifying the communication terminal 2 about the use uplink radio resource allocated to the communication terminal 2 by the radio resource allocating section 122. This allows the communication terminal 2 to know the use uplink radio resource for use in the transmission of data to the base station 1. The communication terminal 2 transmits the data to the base station 1 by radio using the use uplink radio resource.

Further, the radio resource allocating section 122 allocates an uplink radio resource (referred to hereinafter as a "use uplink radio resource for SRS") which a communication terminal 2 uses when transmitting a sounding reference signal (SRS) that is a known signal to be described later to the communication terminal 2. The transmission signal generating section 120 generates and outputs a transmission signal including control data for notifying the communication terminal 2 about the use uplink radio resource for SRS allocated to the communication terminal 2 by the radio resource allocating section 122. This allows the communication terminal 2 to know the use uplink radio resource for SRS for use in the transmission of the SRS to the base station 1. The communication terminal 2 transmits the SRS to the base station 1 by radio using the use uplink radio resource for SRS.

The transmission capability judging section 125 judges whether the transmission capability of each of the communication terminals 2 connected to the base station 1, i.e. each communication terminal 2 with which the communication section 13 communicates, is high or not. For example, the transmission capability judging section 125 judges whether the transmission capability of a communication terminal 2 is high or not, based on the reception signals from the communication terminal 2 which are outputted from the radio processing section 11. Specifically, the transmission capability judging section 125 judges that the transmission capability of a communication terminal 2 is high, when the signal level of the reception signals from the communication terminal 2 is higher than a threshold value. On the other hand, the transmission capability judging section 125 judges that the transmission capability of a communication terminal 2 is low, when the signal level of the reception signals from the communication terminal 2 is lower than the threshold value.

The grouping processing section 126 classifies the plurality of communication terminals 2 with which the communication section 13 communicates into a first terminal group and a second terminal group, based on the QoS (Quality of Service) pursuant to applications which the communication terminals 2 are executing. Based on the control data from a communication terminal 2 which is acquired by the reception data acquiring section 121, the grouping processing section 126 identifies the QoS pursuant to an application which the communication terminal 2 is executing. When the identified QoS is higher than a threshold value, the grouping processing section 126 distributes the communication terminal 2 into the first terminal group. When the identified QoS is lower than the threshold value, the grouping processing section 126 distributes the communication terminal 2 into the second terminal group.

The grouping processing section 126 further classifies the plurality of communication terminals 2 in the second terminal group into a high transmission capability terminal group which is high in transmission capability and a low transmission capability terminal group which is low in transmission capability, based on the result of judgment made by the transmission capability judging section 125. When a communication terminal 2 in the second terminal group is judged to have a high transmission capability by the transmission capability judging section 125, the grouping processing section 126 distributes the communication terminal 2 into the high transmission capability terminal group. On the other hand, when a communication terminal 2 in the second terminal group is judged to have a low transmission capability by the transmission capability judging section 125, the grouping processing section 126 distributes the communication terminal 2 into the low transmission capability terminal group.

The radio resource allocating section 122 allocates the use uplink radio resources for SRS to a communication terminal 2 in consideration for the terminal group to which the communication terminal 2 belongs. A method of allocating the use uplink radio resources for SRS to the communication terminals 2 will be described later in detail.

<Configuration of TDD Frame>

Next, a TDD frame 300 for use between the base station 1 and the communication terminals 2 will be described. The TDD frame 300 is identified by two-dimensions comprised of a time axis and a frequency axis. The base station 1 determines the use uplink radio resources, the use downlink radio resources and the use uplink radio resources for SRS for allocation to the communication terminals 2 from the TDD frame 300.

Figure 3:
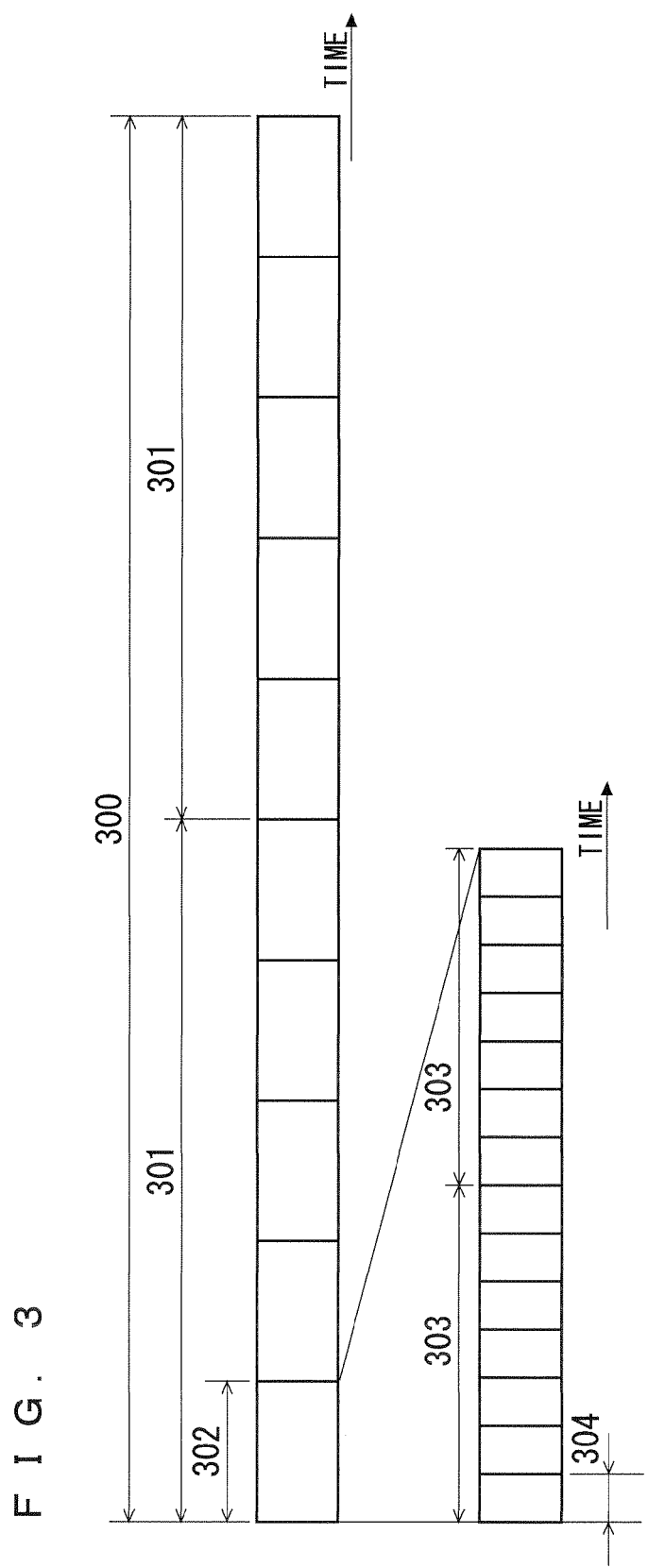
FIG. 3 is a diagram showing a configuration of a TDD frame.

FIG. 3 is a diagram showing a configuration of the TDD frame 300. As shown in FIG. 3, the TDD frame 300 is comprised of two half frames 301. Each of the half frames 301 is comprised of five sub-frames 302. That is, the TDD frame 300 is comprised of ten sub-frames 302. The time length of each of the sub-frames 302 is 1 ms. The ten sub-frames 302 constituting the TDD frame 300 are hereinafter referred to as zeroth to ninth sub-frames 302 in order from the leading end in some cases.

Each of the sub-frames 302 is comprised of two slots 303 arranged in the time direction. Each of the slots 303 is comprised of seven symbol periods 304. Thus, each of the sub-frames 302 includes 14 symbol periods 304 arranged in the time direction. Such a symbol period 304 serves as one symbol period for an OFDM symbol in the downlink communication of the OFDMA system, and serves as one symbol period for a DFTS (Discrete Fourier Transform Spread)-OFDM symbol in the uplink communication of the SC-FDMA system.

The TDD frame 300 having the aforementioned configuration includes sub-frames 302 for uplink communication only, and sub-frames 302 for downlink communication only. A sub-frame 302 for uplink communication only is referred to as an "uplink sub-frame 302" and a sub-frame 302 for downlink communication only is referred to as a "downlink sub-frame 302" hereinafter. The communication terminals 2 transmit data to the base station 1 in the uplink sub-frames 302, and the base station 1 transmits data to the communication terminals 2 in the downlink sub-frames 302.

In LTE, a region (radio resource) of the TDD frame 300 which includes a frequency bandwidth of 180 kHz in the frequency direction and includes seven symbol periods 304 (one slot 303) in the time direction is referred to as a "resource block (RB)." The resource block includes 12 subcarriers. When allocating the use uplink radio resource to a communication terminal 2 or when allocating the use downlink radio resource to a communication terminal 2, the radio resource allocating section 122 allocates the use uplink radio resource or the use downlink radio resource to the communication terminal 2 in units of two consecutive resource blocks, i.e. in units of one sub-frame 302, in the time direction and in units of one resource block in the frequency direction. For convenience of description, the term "RB" shall hereinafter represent only the frequency band of a resource block, rather than the resource block as the original meaning which is identified by the frequency direction and the time direction.

In LTE, seven types of configurations of the TDD frame 300 are specified which differ from each other in combination of the uplink sub-frames 302 and the downlink sub-frames 302. Zeroth to sixth configurations of the TDD frame 300 are specified in LTE.

Figure 4:
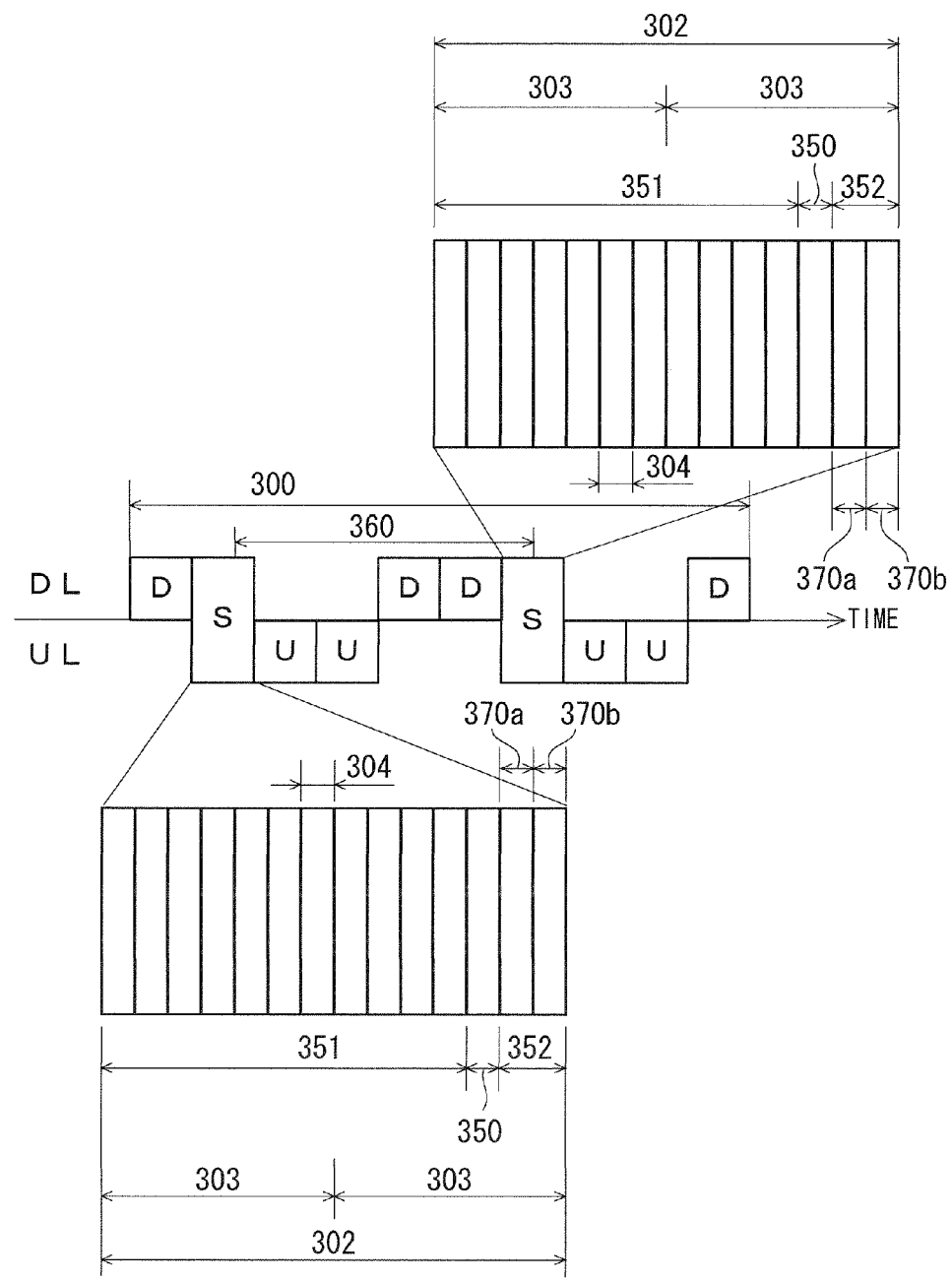
FIG. 4 is a diagram showing the details of the configuration of the TDD frame.

FIG. 4 is a diagram showing a configuration of the TDD frame 300 having the first configuration. In FIG. 4, the sub-frames 302 denoted by "D" mean the downlink sub-frames 302, and the sub-frames 302 denoted by "U" mean the uplink sub-frames 302. Also, the sub-frames 302 denoted by "S" mean sub-frames 302 in which switching from the downlink communication to the uplink communication is performed in the radio communications system 100. The sub-frames 302 of this type are referred to as "special sub-frames 302".

In the TDD frame 300 having the first configuration, the zeroth, fourth, fifth and ninth sub-frames 302 are the downlink sub-frames 302, the second, third, seventh and eighth sub-frames 302 are the uplink sub-frames 302, and the first and sixth sub-frames 302 are the special sub-frames 302, as shown in FIG. 4. The TDD frame 300 having the first configuration, for example, shall be used in the radio communications system 100 according to the present embodiment.

As shown in FIG. 4, each special sub-frame 302 includes a downlink pilot time slot (DwPTS) 351, a guard time (GP) 350, and an uplink pilot time slot (UpPTS) 352. The guard time 350 is a no-signal time period required for the switching from the downlink communication to the uplink communication, and is not used for communication.

A plurality of types of combinations of time lengths of the downlink pilot time slot 351, the guard time 350 and the uplink pilot time slot 352 are specified in LTE. In the example of FIG. 4, the time length of the downlink pilot time slot 351 is set to 11 symbol periods 304, and the time length of the uplink pilot time slot 352 is set to 2 symbol periods 304.

In the radio communications system 100 according to the present embodiment, the downlink communication is allowed to be performed not only in the downlink sub-frame 302 but also in the downlink pilot time slot 351 of the special sub-frame 302. Also in this radio communications system 100, the uplink communication is allowed to be performed not only in the uplink sub-frame 302 but also in the uplink pilot time slot 352 of the special sub-frame 302.

In the present embodiment, the base station 1 transmits data to a communication terminal 2 in each of the symbol periods 304 of the downlink pilot time slot 351. Each of the communication terminals 2 transmits the known signal referred to as the SRS in one or both of the two symbol periods 304 of the uplink pilot time slot 352. The SRS is comprised of a plurality of complex symbols which modulate a plurality of subcarriers. In the present embodiment, the SRS transmitted in the uplink pilot time slot 352 is used for calculation of the transmission weight. In other words, the communication section 13 in the base station 1 is capable of controlling the transmission directivity of the array antenna 110, based on the SRS transmitted from each communication terminal 2 in the uplink pilot time slot 352. The control of the transmission directivity of the array antenna 110 is referred to as "array transmission control" hereinafter.

It should be noted that the SRS can be transmitted in the last symbol period 304 of the uplink sub-frame 302. In other words, each communication terminal 2 is able to transmit data in symbol periods 304 other than the last symbol period 304 of the uplink sub-frame 302, and to transmit the SRS in the last symbol period 304. For the array transmission control, the SRS transmitted in the last symbol period 304 of the uplink sub-frame 302 may be used. However, the SRS transmitted in the uplink pilot time slot 352 shall be used for the array transmission control in the present embodiment.

The SRS shall mean the SRS transmitted using the uplink pilot time slot 352 hereinafter unless otherwise specified. A leading one of the symbol periods 304 and a trailing one thereof included in the uplink pilot time slot 352 in which each communication terminal 2 is able to transmit the SRS are referred to hereinafter as a "first uplink communication period 370a for SRS" and a "second uplink communication period 370b for SRS", respectively. The first uplink communication period 370a for SRS and the second uplink communication period 370b for SRS are referred to as "uplink communication periods for SRS" if the periods 370a and 370b need not particularly be identified.

A time period from the leading end of the first uplink communication period 370a for SRS of a special sub-frame 302 to the leading end of the first uplink communication period 370a for SRS of the next special sub-frame 302 is referred to as a "unit period 360" hereinafter. The allocation of the radio resources such as the use downlink radio resources to the communication terminals 2 is on the basis of the unit period 360. The unit period 360 appears repeatedly in this radio communications system 100.

In the present embodiment, each of the communication terminals 2 which communicates with the base station 1 transmits the SRS at least once in each unit period 360, for example, based on the allocation of the use uplink radio resource for SRS by the radio resource allocating section 122. That is, each of the communication terminals 2 which communicates with the base station 1 transmits the SRS in one or both of the first uplink communication period 370a for SRS and the second uplink communication period 370b for SRS included in each unit period 360.

<Frequency Hopping of SRS Transmittable Band>

Figure 5:
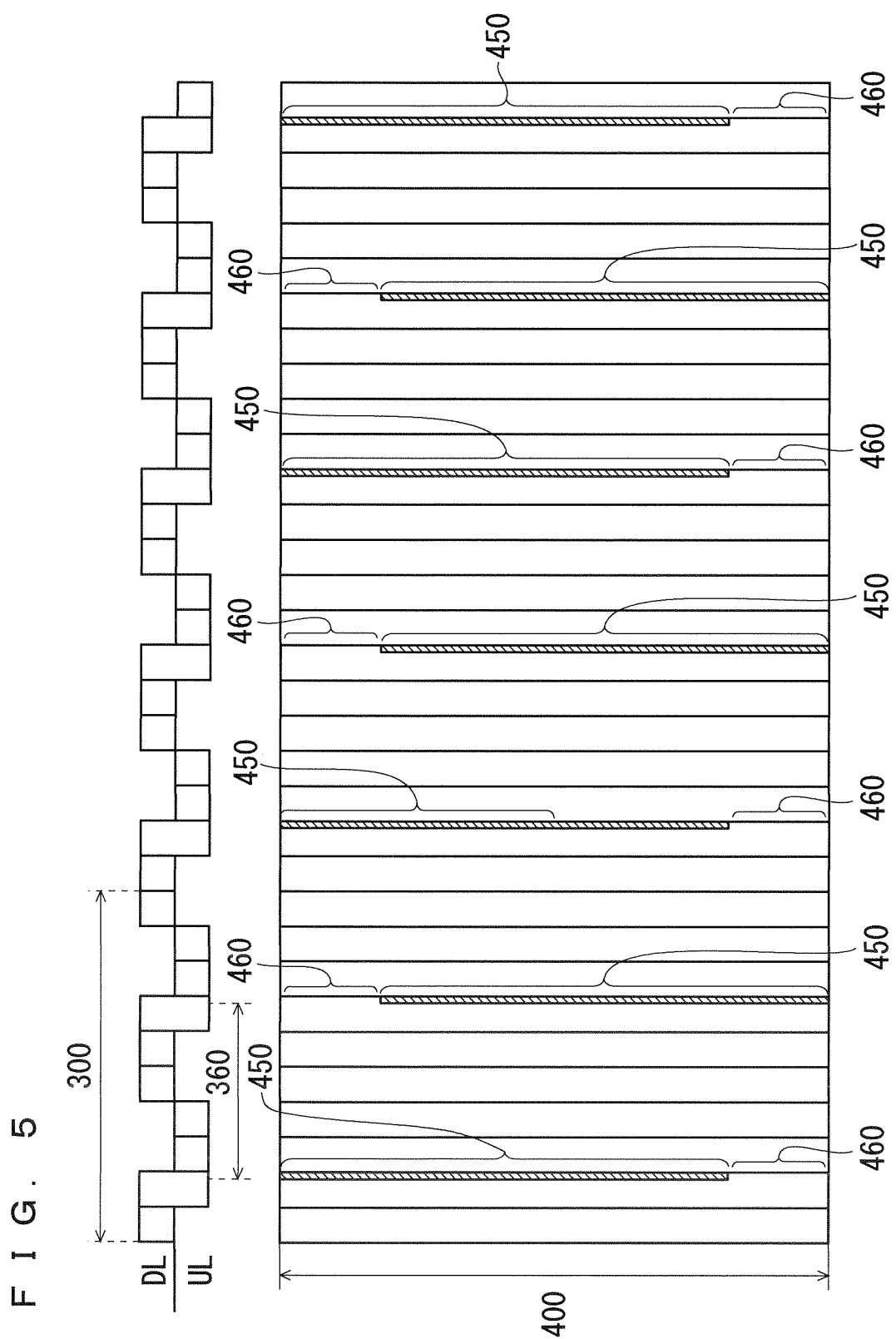
FIG. 5 is a diagram showing the frequency hopping of an SRS transmittable band.

In the present radio communications system 100, a frequency band 450 (referred to hereinafter as an "SRS transmittable band 450") which a communication terminal 2 can use for the transmission of the SRS is frequency-hopped at intervals of one unit period 360. FIG. 5 is a diagram showing the frequency hopping of the SRS transmittable band 450.

As shown in FIG. 5, the SRS transmittable band 450 is disposed alternately on a high-frequency side and on a low-frequency side in a system band 400 at intervals of one unit period 360. Thus, a high-frequency end portion or a low-frequency end portion of the system band 400 in each unit period 360 is a band unusable for the transmission of the SRS. This band is referred to as an "SRS untransmittable band 460" hereinafter. Each base station 1 is not allowed to allocate uplink radio resources including a frequency band included in the SRS untransmittable band 460 in the frequency direction as the use uplink radio resources for SRS to the communication terminals 2.

The base stations 1 have the same SRS untransmittable band 460. Thus, the SRS untransmittable band 460 which a certain base station 1 is not allowed to allocate to the communication terminals 2 for the transmission of the SRSs coincides in each unit period 360 with the SRS untransmittable band 460 which a neighboring base station 1 positioned in the neighborhood of the certain base station 1 is not allowed to allocate to the communication terminals 2 for the transmission of the SRSs.

When the system bandwidth is 10 MHz as in the present embodiment, the system band 400 includes 50 RBs. In this case, the bandwidth of the SRS transmittable band 450 is a frequency bandwidth corresponding to 40 RBs, and the bandwidth of the SRS untransmittable band is a frequency bandwidth corresponding to 10 RBs. The frequency bandwidth corresponding to RBs the number of which is x is referred to as "x RBs" hereinafter.

<Configuration of SRS>

Two types of SRSs identified by a parameter $k_{TC}$ referred to as "transmissionComb" are specified in the radio communications system 100 according to the present embodiment. Each of the communication terminals 2 transmits one of the two types of SRSs in at least one of the first uplink communication period 370 for SRS a and the second uplink communication period 370b for SRS.

The parameter $k_{TC}$ can take a value "0" or "1". Subcarriers SC0 for use in the transmission of the SRS (referred to hereinafter as "SRS0") identified by the parameter $k_{TC}=0$ are not successively disposed but are disposed in the form of comb teeth in the frequency direction. In other words, the carrier frequency of the SRS0 is disposed in the form of comb teeth in the frequency direction. Likewise, subcarriers SC1 for use in the transmission of the SRS (referred to hereinafter as "SRS1") identified by the parameter $k_{TC}=1$ are disposed in the form of comb teeth in the frequency direction. When the SRS0 and the SRS1 are transmitted in the same frequency band, the plurality of subcarriers SC0 for use in the transmission of the SRS0 and the plurality of subcarriers SC1 for use in the transmission of the SRS1 are disposed alternately in the frequency direction. Thus, the carrier frequency of the SRS0 and the carrier frequency of the SRS1 do not overlap each other in the frequency direction.

Figure 6:
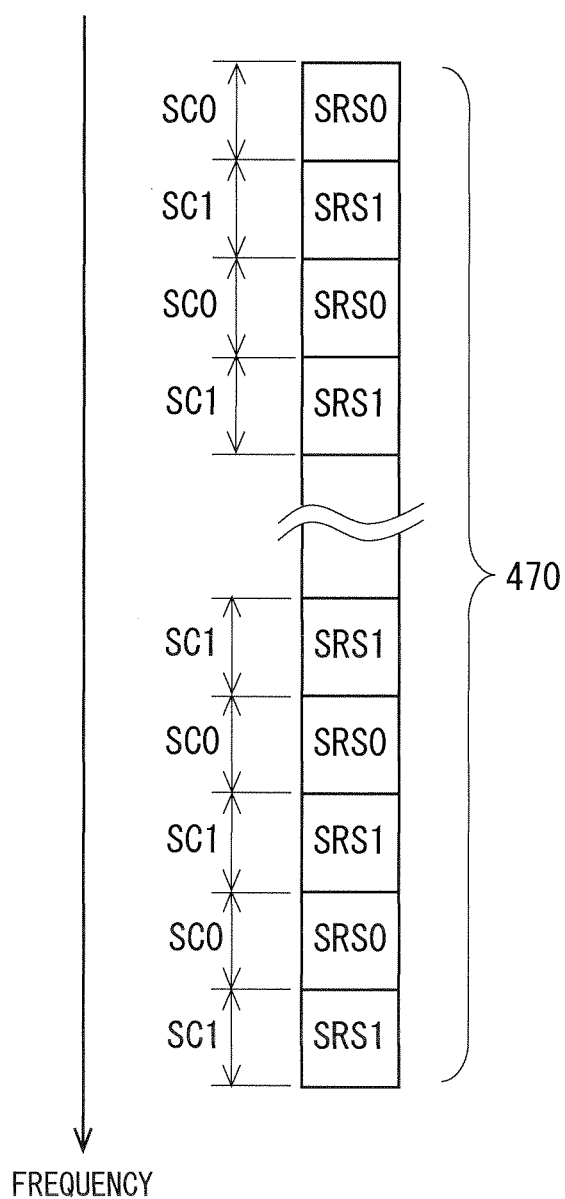
FIG. 6 is a diagram showing SRS0 and SRS1.

FIG. 6 shows that both the SRS0 and the SRS1 are transmitted in a certain frequency band 470. As shown in FIG. 6, the subcarriers SC0 for use in the transmission of the SRS0 are disposed at every other subcarrier position in the frequency direction. Likewise, the subcarriers SC1 for use in the transmission of the SRS1 are disposed at every other subcarrier position in the frequency direction. The subcarriers SC0 and the subcarriers SC1 included in the same frequency band 470 are disposed alternately in the frequency direction.

In this manner, the subcarriers which a communication terminal 2 uses for the transmission of the SRS are disposed in the form of comb teeth in the frequency direction. Thus, half of the subcarriers in a frequency band which the communication terminal 2 uses for the transmission of the SRS are used for the transmission of the SRS. A communication terminal 2 which transmits the SRS0 and a communication terminal 2 which transmits the SRS1 are allowed to use the same frequency band in the same uplink communication period for SRS, because the subcarriers SC0 and the subcarriers SC1 included in the same frequency band are disposed alternately. From the viewpoint of the base station 1, the base station 1 is able to make a distinction between the SRS0 and the SRS1 which are transmitted in the same frequency band in the same uplink communication period for SRS.

Eight types of code patterns comprised of complex symbols constituting the SRS are specified in this radio communications system 100. Eight types of code sequences orthogonal to each other are adopted respectively for the eight types of code patterns. Each communication terminal 2 transmits one of the eight types of code patterns as the SRS.

The eight types of code patterns in which the eight types of code sequences orthogonal to each other are adopted are specified for the SRS. Thus, a maximum of eight communication terminals 2 are able to transmit the SRS0 in the same uplink communication period for SRS using the same frequency band. Further, a maximum of eight communication terminals 2 are able to transmit the SRS1 in the same uplink communication period for SRS using the same frequency band.

In this manner, each of the SRS0 and the SRS1 can be multiplexed in the same frequency band. However, the multiplexing of the SRS0 and the SRS1 shall not be performed in the present embodiment.

An uplink radio resource identified by the first uplink communication period 370a for SRS and the subcarriers SC0 in the form of comb teeth which are included in the SRS transmittable band 450 and usable for the transmission of the SRS0 is referred to as a "first uplink radio resource 500a for SRS" hereinafter. Also, an uplink radio resource identified by the second uplink communication period 370b for SRS and the subcarriers SC0 in the form of comb teeth which are included in the SRS transmittable band 450 and usable for the transmission of the SRS0 is referred to as a "second uplink radio resource 500b for SRS". An uplink radio resource identified by the second uplink communication period 370b for SRS and the subcarriers SC1 in the form of comb teeth which are included in the SRS transmittable band 450 and usable for the transmission of the SRS1 is referred to as a "third uplink radio resource 500c for SRS". An uplink radio resource identified by the first uplink communication period 370a for SRS and the subcarriers SC1 in the form of comb teeth which are included in the SRS transmittable band 450 and usable for the transmission of the SRS1 is referred to as a "fourth uplink radio resource 500d for SRS".

FIG. 7 shows the first uplink radio resource 500a for SRS, the second uplink radio resource 500b for SRS, the third uplink radio resource 500c for SRS and the fourth uplink radio resource 500d for SRS. As shown in FIG. 7, the first uplink radio resource 500a for SRS, the second uplink radio resource 500b for SRS, the third uplink radio resource 500c for SRS and the fourth uplink radio resource 500d for SRS which are included in the same unit period 360 differ from each other in at least one of the time direction and the frequency direction. These uplink radio resources are referred to as "uplink radio resources for SRS" when the uplink radio resources need not particularly be identified.

<Frequency Hopping of Transmission Frequency Band of SRS>

In the radio communications system 100 according to the present embodiment, the transmission frequency band of the SRS may be frequency-hopped in the SRS transmittable band 450. Also, the transmission frequency bandwidth of the SRS is variable in present radio communications system 100. Three types of bandwidths of 40 RBs, 20 RBs and 4 RBs are determined as the bandwidth that can be set as the transmission frequency bandwidth of the SRS in the present radio communications system 100. Of the three types of bandwidths, only two types of bandwidths, i.e. 20 RBs and 4 RBs which is a minimum bandwidth, are used in the radio resource allocating section 122.

Figure 8:
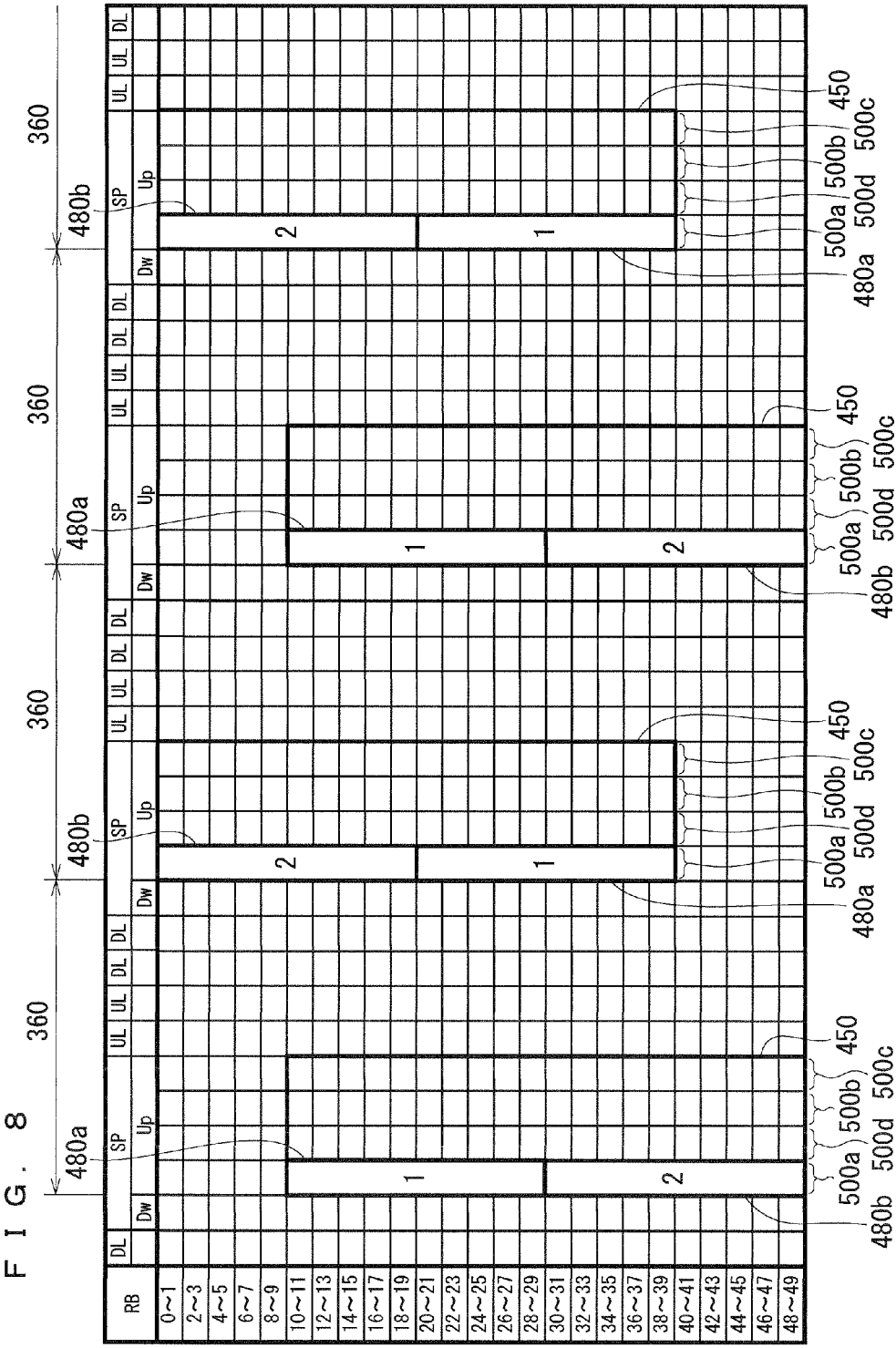
FIG. 8 is a diagram showing the frequency hopping of the transmission frequency band of an SRS.

FIG. 8 shows an example of the frequency hopping of a transmission frequency band 480a of the SRS transmitted from a communication terminal 2 having a terminal number 1 and a transmission frequency band 480b of the SRS transmitted from a communication terminal 2 having a terminal number 2 in the SRS transmittable band 450. The sub-frames 302 in a plurality of consecutive unit periods 360 are shown in FIG. 8. In FIG. 8, the horizontal direction indicates the time direction, and the vertical direction indicates the frequency direction. The numbers in the range of 0 to 49 indicated in the leftmost portion of FIG. 8 indicate the numbers of the 50 RBs arranged in the frequency direction. The greater the numbers of the RBs, the greater the RBs. Also, "SP" indicated in FIG. 8 means the special sub-frame 302, "Up" means the uplink pilot time slot (UpPTS) 352, and "Dw" means the downlink pilot time slot (DwPTS) 351. Also, "UL" and "DL" indicated in FIG. 8 mean the uplink sub-frame 302 and the downlink sub-frame 302, respectively.

In the example of FIG. 8, each of the communication terminals 2 having the terminal numbers 1 and 2 transmits the SRS once in each unit period 360. The transmission frequency bandwidth of the SRS transmitted from each of the communication terminals 2 having the terminal numbers 1 and 2 is set to 20 RBs. In the example of FIG. 8, the transmission frequency band 480a of the SRS transmitted from the communication terminal 2 having the terminal number 1 and the transmission frequency band 480b of the SRS transmitted from the communication terminal 2 having the terminal number 2 are disposed alternately on the high-frequency side and on the low-frequency side in the SRS transmittable band 450 at intervals of one unit period 360.

More specifically, the transmission frequency band 480a is disposed on the low-frequency side in the SRS transmittable band 450 in a unit period 360 where the SRS transmittable band 450 is disposed on the high-frequency side, and is disposed on the high-frequency side in the SRS transmittable band 450 in a unit period 360 where the SRS transmittable band 450 is disposed on the low-frequency side. Thus, the transmission frequency band 480a is frequency-hopped in a frequency band comprised of 30 RBs (the RBs numbered 10 through 39) lying in an intermediate portion of the system band. For this reason, the SRS is not transmitted from the communication terminal 2 having the terminal number 1 in an end portion comprised of 10 RBs on the low-frequency side of the system band and in an end portion comprised of 10 RBs on the high-frequency side of the system band.

On the other hand, the transmission frequency band 480b is disposed on the high-frequency side in the SRS transmittable band 450 in a unit period 360 where the SRS transmittable band 450 is disposed on the high-frequency side, and is disposed on the low-frequency side in the SRS transmittable band 450 in a unit period 360 where the SRS transmittable band 450 is disposed on the low-frequency side. Thus, the transmission frequency band 480b is disposed alternately on the high-frequency side and on the low-frequency side in the system band. For this reason, the SRS is not transmitted from the communication terminal 2 having the terminal number 2 in a frequency band comprised of 10 RBs (the RBs numbered 20 through 29) lying in an intermediate portion of the system band.

The radio resource allocating section 122 according to the present embodiment determines the transmission mode of the SRS for each of the communication terminals 2 with which the base station 1 communicates. Specifically, the radio resource allocating section 122 determines the uplink communication period for SRS to be used, the value of the SRS parameter $k_{TC}$, the transmission frequency bandwidth of the SRS, the mode of the frequency hopping of the transmission frequency band of the SRS and the like for each of the communication terminals 2. Thus, the use uplink radio resources for SRS are allocated to the communication terminals 2 with which the base station 1 communicates.

The transmission signal generating section 120 generates a transmission signal including control data for notifying a communication terminal 2 about the use uplink radio resource for SRS allocated to the communication terminal 2 by the radio resource allocating section 122, that is, control data (referred to hereinafter as "SRS control data") for notifying the communication terminal 2 about the transmission mode of the SRS to be transmitted from the communication terminal 2 which is determined by the radio resource allocating section 122. This transmission signal is transmitted from the communication section 13 to the communication terminal 2 using the downlink sub-frame 302. Thus, the SRS control data is transmitted to each communication terminal 2. This allows each communication terminal 2 to know the uplink radio resource for use in transmitting the SRS. In other words, this allows each communication terminal 2 to know the transmission mode of the SRS to be transmitted therefrom. Each communication terminal 2 transmits the SRS using the use uplink radio resource for SRS about which notification is provided from the base station 1.

It should be noted that the SRS control data includes transmission start data for providing an instruction to start the transmission of the SRS or transmission stop data for providing an instruction to stop the transmission of the SRS. Upon receipt of the SRS control data including the transmission start data, a communication terminal 2 which is not transmitting the SRS starts the transmission of the SRS using the use uplink radio resource for SRS about which notification is received using the SRS control data. Upon receipt of the SRS control data including the transmission stop data, a communication terminal 2 which is transmitting the SRS stops the transmission of the SRS. To change the uplink radio resource which a communication terminal 2 uses for the transmission of the SRS, notification about the SRS control data for providing notification about a new use uplink radio resource for SRS is provided to the communication terminal 2. The SRS control data is referred to as an "RRCConnectionReconfiguration message" in LTE.

<Basic Operation in Radio Communications System in Controlling Transmission of SRS>

Figure 9:
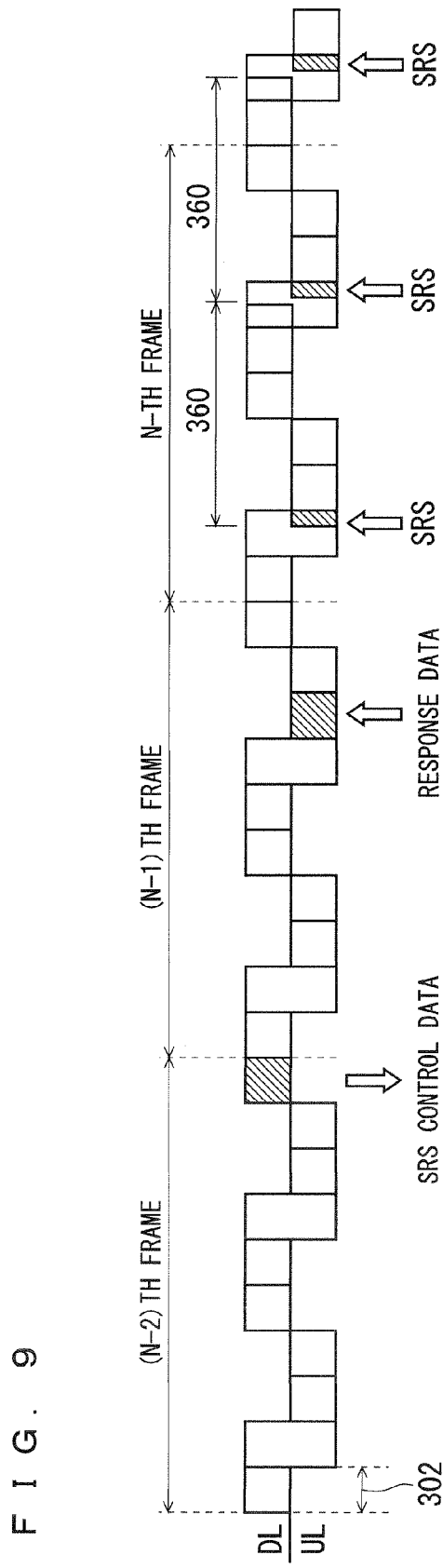
FIG. 9 is a diagram showing the operation of the radio communications system.

Next, description will be given on a basic operation in the radio communications system 100 after a communication terminal 2 receives new SRS control data and until the communication terminal 2 transmits the SRS based on a new SRS control signal. FIG. 9 is a diagram showing such an operation. A communication terminal 2 about which description is given is referred to hereinafter as a "target communication terminal 2" in some cases.

As shown in FIG. 9, after a new SRS control signal is transmitted from the base station 1 toward a target communication terminal 2, for example, in the downlink sub-frame 302 positioned in the trailing end of the (N−2)th TDD frame 300, the target communication terminal 2 transmits a response signal for notifying the base station 1 that the new SRS control signal is normally received to the base station 1 in the eighth uplink sub-frame 302 from the leading end of the subsequent (N−1)th TDD frame 300. Such a response signal is referred to as an "RRCConnectionReconfiguration-Complete message". Thus, a new use uplink radio resource for SRS is set in the target communication terminal 2.

After transmitting the response signal, the target communication terminal 2 transmits the SRS at intervals of one unit period 360 in and after the subsequent N-th TDD frame 300 using the use uplink radio resource for SRS about which notification is provided by the new SRS control signal received in the (N−2)th TDD frame 300. It should be noted that, until transmitting the SRS using the use uplink radio resource for SRS about which notification is provided by the new SRS control signal, the target communication terminal 2 transmits the SRS using the use uplink radio resource for SRS about which the notification is provided by the received SRS control signal which precedes the new SRS control signal.

In this manner, after the base station 1 transmits a new SRS control signal to the target communication terminal 2 in a certain TDD frame 300, the target communication terminal 2 starts transmitting the SRS, based on the new SRS control signal, in and after a TDD frame 300 which is the next but one counting from the certain TDD frame 300. Thus, in the case where the base station 1 instructs the target communication terminal 2 to start the transmission of the SRS or to change the transmission mode of the SRS, it takes 10 ms or more between the transmission of the SRS control data to the target communication terminal 2 and the reception of the SRS transmitted from the target communication terminal 2, based on the SRS control data.

<About Array Transmission Control>

For the array transmission control according to the present embodiment, when the communication section 13 performs downlink communication using a use downlink radio resource allocated to a communication terminal 2, the transmission weights are determined based on the SRS which the communication terminal 2 transmits in the frequency band of the use downlink radio resource.

Also, null steering and beamforming are performed at the same time for the array transmission control according to the present embodiment. The communication section 13 updates the reception weights a plurality of times using a sequential update algorithm such as RLS (Recursive Least-Squares) algorithm, for example, to determine the transmission weights, based on the reception weights after the completion of the update, whereby both the null steering and the beamforming are performed at the same time.

In the array transmission control according to the present embodiment, a transmission weight is determined, for example, for each RB. For example, when the frequency band of the use downlink radio resource allocated to a communication terminal 2 is comprised of four RBs, the transmission weights for the respective four RBs are determined in the array transmission control for the communication terminal 2. For the determination of the transmission weight to be applied to a signal to be transmitted to a communication terminal 2 using a certain RB included in the frequency band of the use downlink radio resource, the reception weight is updated a plurality of times, based on the plurality of complex symbols constituting the SRS which the communication terminal 2 transmits using the certain RB. Then, the transmission weight is determined based on the reception weight obtained after the completion of the update.

<Correspondence between Downlink Radio Resources and Uplink Radio Resources for SRS>

In the radio communications system 100 according to the present embodiment, a correspondence between the downlink radio resources and the uplink radio resources for SRS is defined for the null steering and the beamforming based on the SRS. Each base station 1 allocates the use downlink radio resources to the communication terminals 2 which transmit the SRSs, based on the correspondence, and performs the array transmission control, to thereby appropriately accomplish the null steering and the beamforming. This correspondence is referred to as a "resource correspondence for array control" hereinafter. The resource correspondence for array control will be described below.

A leading one of the two downlink sub-frames 302 included in a unit period 360 is referred to as a "first downlink sub-frame 302a" and a trailing one thereof is referred to as a "second downlink sub-frame 302b" hereinafter. Part of the special sub-frame 302 included in a unit period 360 which includes the downlink pilot time slot 351 is not the downlink sub-frame 302 but is referred to as a "third downlink sub-frame 302c" hereinafter for convenience of description. The downlink sub-frames 302 shall include this third downlink sub-frame 302c hereinafter. A unit period 360 about which description is given is referred to as a "target unit period 360" hereinafter.

Figure 10:
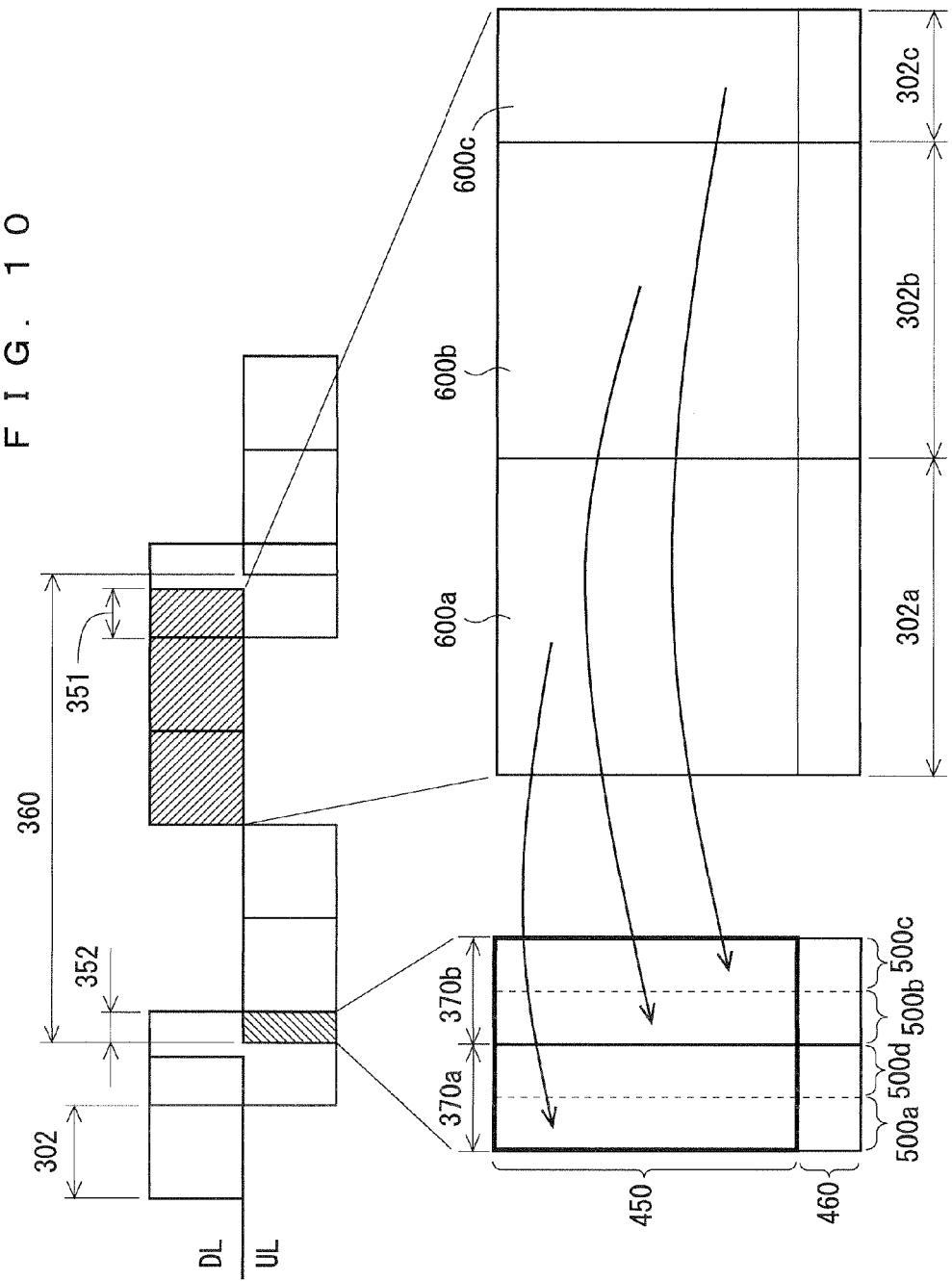
FIG. 10 is a diagram showing a correspondence between uplink radio resources for SRS and downlink radio resources for SRS.

FIG. 10 is a diagram for illustrating the correspondence between the downlink radio resources and the uplink radio resources for SRS in a target unit period 360. The following description holds true for each unit period 360.

In the present embodiment, a downlink radio resource included in a downlink radio resource 600a including the SRS transmittable band 450 in the frequency direction in the first downlink sub-frame 302a of the target unit period 360 is brought into correspondence with an uplink radio resource including the frequency band of the downlink radio resource in the frequency direction in the first uplink radio resource 500a for SRS in the target unit period 360. That is, a downlink radio resource included in the downlink radio resource 600a in the target unit period 360 is brought into correspondence with an uplink radio resource having a frequency band identical with that of the downlink radio resource in the first uplink radio resource 500a for SRS in the target unit period 360.

Also, a downlink radio resource included in a downlink radio resource 600b including the SRS transmittable band 450 in the frequency direction in the second downlink sub-frame 302b of the target unit period 360 is brought into correspondence with an uplink radio resource including the frequency band of the downlink radio resource in the frequency direction in the second uplink radio resource 500b for SRS in the target unit period 360.

A downlink radio resource included in a downlink radio resource 600c including the SRS transmittable band 450 in the frequency direction in the third downlink sub-frame 302c of the target unit period 360 is brought into correspondence with an uplink radio resource including the frequency band of the downlink radio resource in the frequency direction in the third uplink radio resource 500c for SRS in the target unit period 360.

In each base station 1, the allocation of the use downlink radio resources to the communication terminals 2 and the array transmission control are performed based on such resource correspondence for array control.

Specifically, when allocating a use downlink radio resource to the target communication terminal 2 from the downlink radio resources of the target unit period 360, the radio resource allocating section 122 allocates only the use downlink radio resource (referred to hereinafter as an "SRS corresponding use downlink radio resource"), if possible, such that the target communication terminal 2 transmits the SRS using the uplink radio resource brought into correspondence with the use downlink radio resource. In other words, when allocating a use downlink radio resource to the target communication terminal 2 from the downlink radio resources of the target unit period 360, the radio resource allocating section 122 allocates a downlink radio resource brought into correspondence with the uplink radio resource which the target communication terminal 2 uses in the target unit period 360 for the transmission of the SRS, if possible, as the use downlink radio resource.

However, this does not apply in the case where only the SRS corresponding use downlink radio resource is insufficient during the downlink communication with the target communication terminal 2 in the target unit period 360. In this case, the radio resource allocating section 122 sometimes allocates a use downlink radio resource such that the target communication terminal 2 does not transmit the SRS using the uplink radio resource brought into correspondence with the use downlink radio resource or a use downlink radio resource including at least part of the SRS untransmittable band 460 in the frequency direction (both of which are referred to collectively as an "SRS non-corresponding use downlink radio resource") to the target communication terminal 2 from the downlink radio resources of the target unit period 360. In other words, the radio resource allocating section 122 sometimes allocates a downlink radio resource which is not brought into correspondence with the uplink radio resource which the target communication terminal 2 uses in the target unit period 360 for the transmission of the SRS as the use downlink radio resource.

In this manner, the radio resource allocating section 122 according to the present embodiment allocates only the SRS corresponding use downlink radio resources to the communication terminals 2 in principle, but sometimes allocates the SRS non-corresponding use downlink radio resources to the communication terminals 2 as an exception.

For the downlink communication with the target communication terminal 2 using an SRS corresponding use downlink radio resource allocated to the target communication terminal 2 by the radio resource allocating section 122, the communication section 13 in each base station 1 performs the array transmission control, based on the SRS transmitted from the target communication terminal 2 using the uplink radio resource brought into correspondence with the SRS corresponding use downlink radio resource.

For the downlink communication with the target communication terminal 2 using an SRS non-corresponding use downlink radio resource allocated to the target communication terminal 2 by the radio resource allocating section 122, the communication section 13 in each base station 1, on the other hand, performs the array transmission control, based on the SRS, when the target communication terminal 2 is transmitting the SRS using the frequency band of the SRS non-corresponding use downlink radio resource. For the downlink communication with the target communication terminal 2 using an SRS non-corresponding use downlink radio resource allocated to the target communication terminal 2 by the radio resource allocating section 122, the communication section 13 in each base station 1 does not perform the array transmission control, when the target communication terminal 2 is not transmitting the SRS using the frequency band of the SRS non-corresponding use downlink radio resource. That is, the communication section 13 performs omni transmission at this time.

As mentioned above, the transmission frequency band of the SRS is frequency-hopped in the SRS transmittable band 450 (with reference to FIG. 8). Thus, when an SRS non-corresponding use downlink radio resource is allocated to the target communication terminal 2 from the downlink radio resources of the target unit period 360, the target communication terminal 2 is sometimes transmitting the SRS using the frequency band of the SRS non-corresponding use downlink radio resource before the target unit period 360. In such a case, the communication section 13 performs the array transmission control, based on the SRS.

The use uplink radio resource for SRS is allocated from the fourth uplink radio resource 500d for SRS to a communication terminal 2 connected to each base station 1 in the case where the use downlink radio resource cannot be allocated to such a communication terminal 2 because of the generation of no data to be transmitted thereto or because of the absence of an unallocated downlink radio resource in the presence of data to be transmitted thereto. That is, a communication terminal 2 which does not perform the downlink communication with any base station 1 transmits the SRS using the uplink radio resource included in the fourth uplink radio resource 500*d* for SRS.

Figure 11:
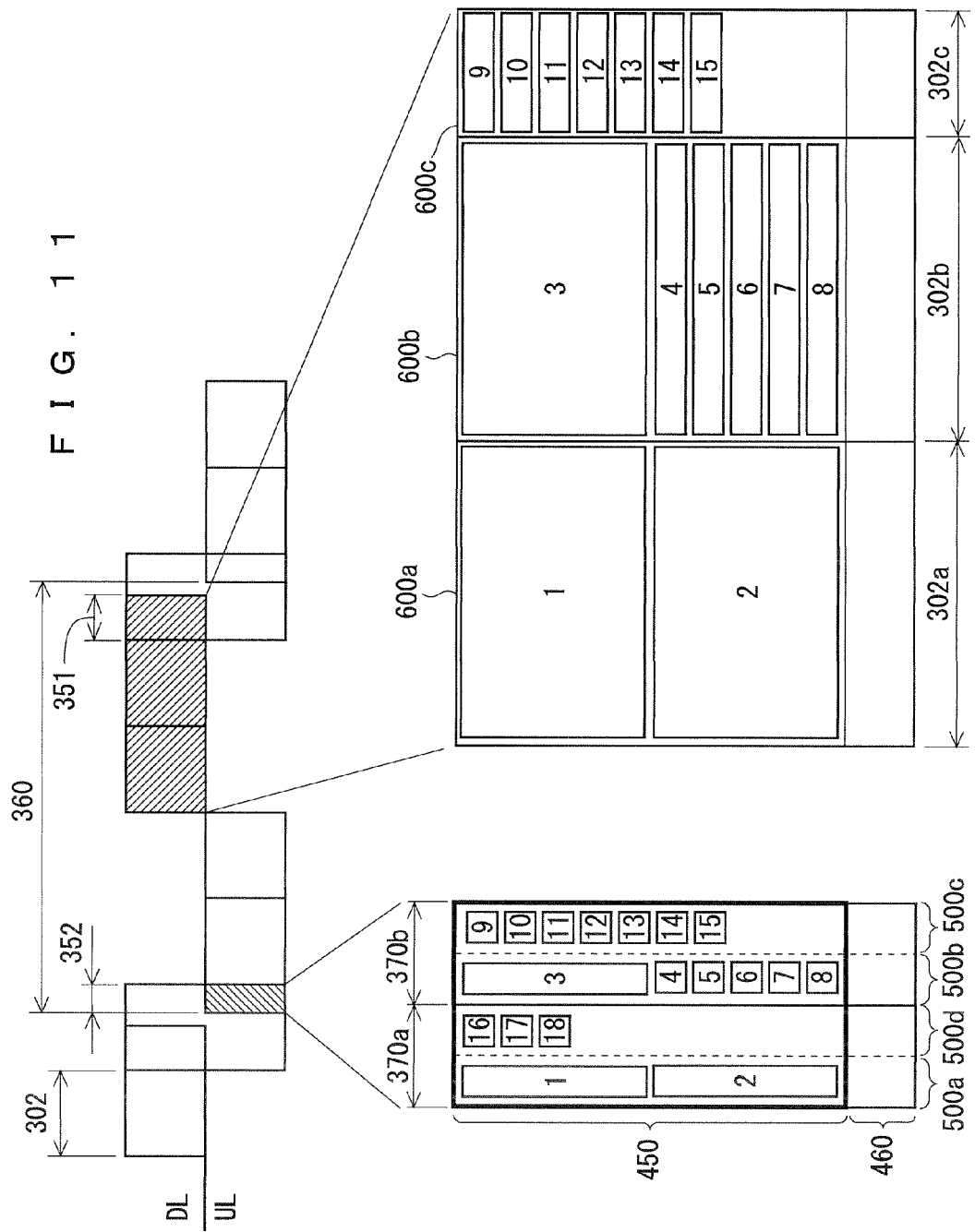
FIG. 11 is a diagram showing an example of the allocation of use downlink radio resources to communication terminals in the base station according to the embodiment of the present invention.

FIG. 11 is a diagram showing an example of the allocation of the use downlink radio resources to communication terminals 2 having terminal numbers 1 to 18 in the target unit period 360. In the example of FIG. 11, only the use downlink radio resources are allocated to the communication terminals 2 having the terminal numbers 1 to 15.

Specifically, use downlink radio resources included in the first downlink sub-frame 302*a* are allocated to the communication terminals 2 having the terminal numbers 1 and 2, respectively, each of which transmits the SRS using the use uplink radio resource of 20 RBs included in the first uplink radio resource 500*a* for SRS.

A use downlink radio resource included in the second downlink sub-frame 302*b* is allocated to the communication terminal 2 having the terminal number 3 which transmits the SRS using the use uplink radio resource of 20 RBs included in the second uplink radio resource 500*b* for SRS.

Use downlink radio resources included in the second downlink sub-frame 302*b* are allocated to the communication terminals 2 having the terminal numbers 4 to 8, respectively, each of which transmits the SRS using the use uplink radio resource of 4 RBs included in the second uplink radio resource 500*b* for SRS.

Use downlink radio resources included in the third downlink sub-frame 302*c* are allocated to the communication terminals 2 having the terminal numbers 9 to 15, respectively, each of which transmits the SRS using the use uplink radio resource of 4 RBs included in the third uplink radio resource 500*c* for SRS.

Use uplink radio resources for SRS included in the fourth uplink radio resource 500*d* for SRS are allocated to the communication terminals 2 having the terminal numbers 16 to 18, respectively, to which no use downlink radio resources are to be allocated.

In the present radio communications system 100, each base station 1 uses the SRS corresponding use downlink radio resources to perform downlink communication with the communication terminals 2, thereby appropriately performing the beamforming and the null steering. This will be described below.

Figure 12:
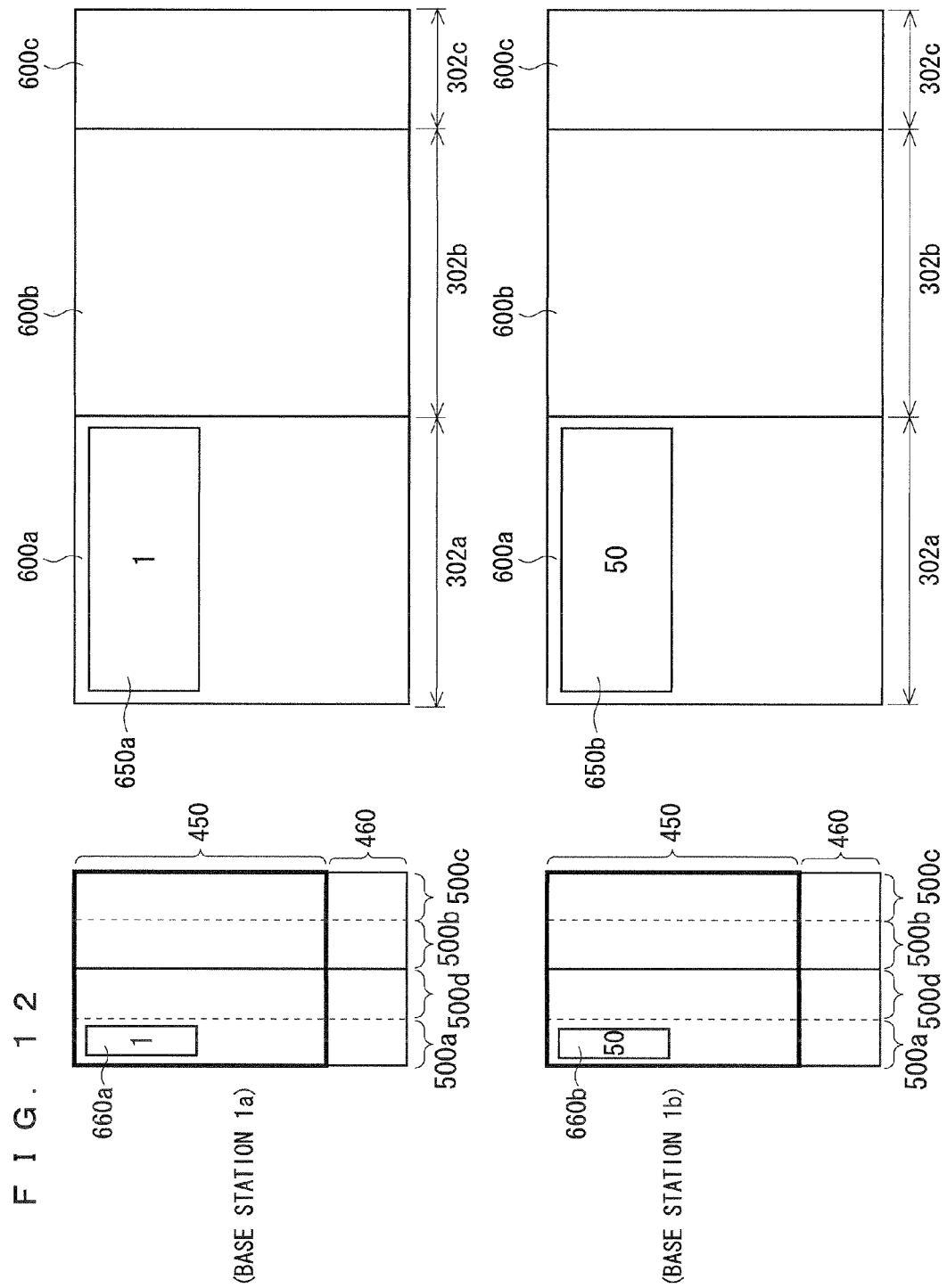
FIG. 12 is a diagram illustrating beamforming and null steering.
Figure 13:
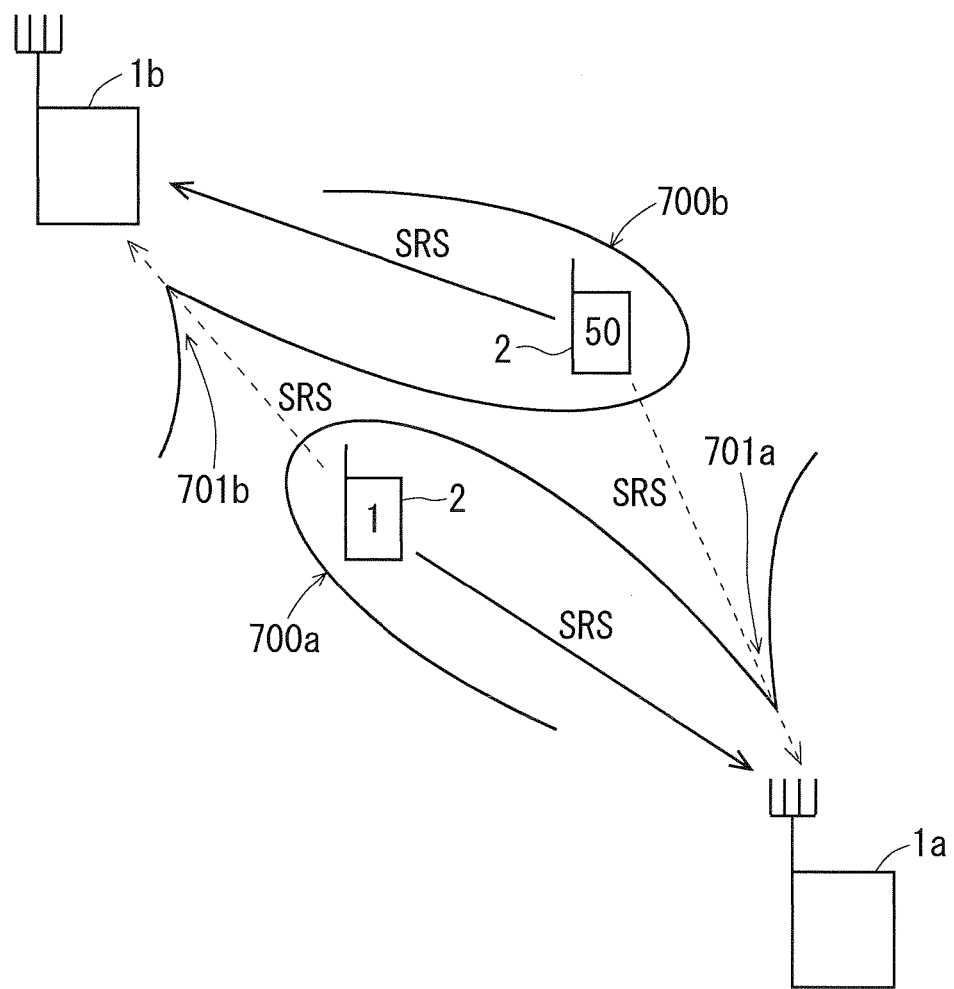
FIG. 13 is a diagram illustrating beamforming and null steering.

FIGS. 12 and 13 are diagrams for illustrating that a base station 1*a* and a base station 1*b* positioned in the neighborhood of the base station 1*a* use the SRS corresponding use downlink radio resources, whereby the beamforming and the null steering are appropriately performed in each of the base stations 1*a* and 1*b*. An example of the allocation of the SRS corresponding use downlink radio resources in the base stations 1*a* and 1*b* in the target unit period 360 is shown in FIG. 12. Beams and nulls related to the transmission directivity in the base stations 1*a* and 1*b* in the target unit period 360 are shown in FIG. 13.

In the example of FIGS. 12 and 13, the base station 1*a* uses an SRS corresponding use downlink radio resource 650*a* to perform downlink communication with the communication terminal 2 having the terminal number 1 in the target unit period 360. The base station 1*b* uses an SRS corresponding use downlink radio resource 650*b* which is the same as the SRS corresponding use downlink radio resource 650*a* to perform downlink communication with a communication terminal 2 having a terminal number 50. Thus, there is a likelihood that, when performing downlink communication with the communication terminal 2 having the terminal number 1, the base station 1*a* interferes with the communication terminal 2 having the terminal number 50 which performs downlink communication with the base station 1*b* positioned in the neighborhood of the base station 1*a*. Likewise, there is a likelihood that, when performing downlink communication with the communication terminal 2 having the terminal number 50, the base station 1*b* interferes with the communication terminal 2 having the terminal number 1 with which the base station 1*a* positioned in the neighborhood of the base station 1*b* performs downlink communication.

In the example of FIGS. 12 and 13, the SRS corresponding use downlink radio resource 650*a* is allocated to the communication terminal 2 having the terminal number 1 from the downlink radio resource 600*a* including the SRS transmittable band 450 in the target unit period 360 in the frequency direction in the first downlink sub-frame 302*a*. Likewise, the SRS corresponding use downlink radio resource 650*b* is allocated to the communication terminal 2 having the terminal number 50 from the downlink radio resource 600*a* including the SRS transmittable band 450 in the target unit period 360 in the frequency direction in the first downlink sub-frame 302*a*.

For the downlink communication using the SRS corresponding use downlink radio resource 650*a*, the base station 1*a* uses an uplink radio resource brought into correspondence with the SRS corresponding use downlink radio resource 650*a*, i.e. an uplink radio resource 660*a* including the frequency band of the SRS corresponding use downlink radio resource 650*a* in the frequency direction in the first uplink radio resource for SRS 500*a* in the target unit period 360, to perform the array transmission control, based on the SRS transmitted from the communication terminal 2 having the terminal number 1. For the downlink communication using the SRS corresponding use downlink radio resource 650*b*, the base station 1*b* uses an uplink radio resource brought into correspondence with the SRS corresponding use downlink radio resource 650*b*, i.e. an uplink radio resource 660*b* including the frequency band of the SRS corresponding use downlink radio resource 650*b* in the frequency direction in the first uplink radio resource for SRS 500*a* in the target unit period 360, to perform the array transmission control, based on the SRS transmitted from the communication terminal 2 having the terminal number 50.

In this manner, for the downlink communication with the communication terminal 2 having the terminal number 1 using the SRS corresponding use downlink radio resource 650*a*, the base station 1*a* performs the array transmission control, based on the SRS transmitted from the communication terminal 2 having the terminal number 1 in the frequency band coinciding with the frequency band of the SRS corresponding use downlink radio resource 650*a*. Thus, as shown in FIG. 13, a beam 700*a* related to the transmission directivity in the base station 1*a* is directed toward the communication terminal 2 having the terminal number 1 for communication therewith. This appropriately achieves the beamforming in the base station 1*a*.

Likewise, for the downlink communication with the communication terminal 2 having the terminal number 50 using the SRS corresponding use downlink radio resource 650*b*, the base station 1*b* performs the array transmission control, based on the SRS transmitted from the communication terminal 2 having the terminal number 50 in the frequency band coinciding with the frequency band of the SRS corresponding use downlink radio resource 650*b*. Thus, a beam 700*b* related to the transmission directivity in the base station 1*b* is directed toward the communication terminal 2 having the terminal number 50 for communication therewith. This appropriately achieves the beamforming in the base station 1*b*.

When the base station 1a and the base station 1b positioned in the neighborhood of the base station 1a use the same SRS corresponding use downlink radio resource to perform downlink communication as in this example, the uplink radio resource 660a for use in the transmission of the SRS which the base station 1a uses for array transmission control coincides with the uplink radio resource 660b for use in the transmission of the SRS which the base station 1b uses for array transmission control. For this reason, the SRS transmitted from the communication terminal 2 having the terminal number 50 communicating with the base station 1b is included as an interference wave component in the SRS which the base station 1a receives from the communication terminal 2 having the terminal number 1 in the uplink radio resource 660a. Thus, when the base station 1a calculates transmission weights, based on the SRS received from the communication terminal 2 having the terminal number 1 in the uplink radio resource 660a, to assign the transmission weights to a transmission signal to be transmitted to the communication terminal 2 having the terminal number 1 using the SRS corresponding use downlink radio resource 650a, a null 701a related to the transmission directivity in the base station 1a is directed toward the communication terminal 2 having the terminal number 50 communicating with the base station 1b to which interference is not desired to be provided, as shown in FIG. 13. This appropriately achieves the null steering in the base station 1a.

From the viewpoint of the base station 1b, the SRS transmitted from the communication terminal 2 having the terminal number 1 communicating with the base station 1a is included as an interference wave component in the SRS which the base station 1b receives from the communication terminal 2 having the terminal number 50 in the uplink radio resource 660b. Thus, when the base station 1b calculates transmission weights, based on the SRS received from the communication terminal 2 having the terminal number 50 in the uplink radio resource 660b, to assign the transmission weights to a transmission signal to be transmitted to the communication terminal 2 having the terminal number 50 using the SRS corresponding use downlink radio resource 650b, a null 701b related to the transmission directivity in the base station 1b is directed toward the communication terminal 2 having the terminal number 1 communicating with the base station 1b to which interference is not desired to be provided, as shown in FIG. 13. This appropriately achieves the null steering in the base station 1b.

In this manner, when the base station 1 and the neighboring base station 1 positioned in the neighborhood of the base station 1 use the same SRS corresponding use downlink radio resource to perform downlink communication, the beamforming and the null steering are appropriately performed in each of the base stations 1 and the neighboring base station 1.

On the other hand, when a base station 1 uses the SRS non-corresponding use downlink radio resource to perform downlink communication with a communication terminal 2, the beamforming is appropriately performed in some cases, but the null steering is not appropriately performed.

The base station 1 performs the array transmission control, based on an SRS, when the base station 1 uses the SRS non-corresponding use downlink radio resource to perform downlink communication with a communication terminal 2 and the communication terminal 2 transmits the SRS in the frequency band identical with the frequency band of the SRS non-corresponding use downlink radio resource. Thus, a beam related to the transmission directivity of the array antenna 110 in the base station 1 is directed toward the communication terminal 2 in this case. As a result, the base station 1 appropriately performs the beamforming as in the case where the SRS corresponding use downlink radio resource is used.

On the other hand, consideration will be given to an instance where a base station 1 and a neighboring base station 1 positioned in the neighborhood of the base station 1 use the same use downlink radio resource to perform downlink communication, where the SRS non-corresponding use downlink radio resource is used in the base station 1, where a communication terminal 2 for communication with the base station 1 transmits the SRS in the frequency band identical with the frequency band of the SRS non-corresponding use downlink radio resource, and where the SRS corresponding use downlink radio resource is used in the neighboring base station 1. It will be understood from the aforementioned description that the SRS which the base station 1 uses for array transmission control and the SRS which the neighboring base station 1 uses for array transmission control are transmitted using uplink radio resources different from each other in this case. Thus, the SRS from the communication terminal 2 with which the neighboring base station 1 communicates is not included as an interference wave component in the SRS which the base station 1 uses for array transmission control, and the SRS from the communication terminal 2 with which the base station 1 communicates is not included as an interference wave component in the SRS which the neighboring base station 1 uses for array transmission control. Thus, the base station 1 is unable to direct a null related to the transmission directivity of the array antenna 110 toward the communication terminal 2 with which the neighboring base station 1 communicates, and the neighboring base station 1 is unable to direct a null related to the transmission directivity of the array antenna 110 toward the communication terminal 2 with which the base station 1 communicates. As a result, the null steering is not appropriately achieved in the base station 1 and in the neighboring base station 1.

In this manner, the null steering is not appropriately achieved when the base station 1 uses the SRS non-corresponding use downlink radio resource to perform downlink communication with the communication terminal 2. For this reason, each base station 1 allocates the SRS corresponding use downlink radio resources, if possible, to the communication terminals 2.

<Grouping of Communication Terminals>

In the present embodiment, an application with high QoS is an application which is small in the amount of generated transfer data (low traffic), short in allowable delay time of transfer data, and high in allowable error rate of transfer data. On the other hand, an application with low QoS is an application which is large in the amount of generated transfer data (high traffic), long in allowable delay time of transfer data, and low in allowable error rate of transfer data.

FIG. 14 is a table showing the allowable delay time and the allowable error rate of transfer data in applications. FIGS. 15 to 19 show traffic models for applications. The traffic models show changes in the amount of generated transfer data in the applications with time. In FIGS. 15 to 19, the abscissa represents time, and the ordinate represents the amount of transfer data.

Applications with high QoS (communication services with high QoS) in the present embodiment include an application (hereinafter referred to simply as "VoIP" in some cases) in which VoIP (Voice over Internet Protocol) is used, an application (hereinafter referred to simply as "Game" in some cases) for a real-time game, and an application (hereinafter referred to simply as "Video" in some cases) for a real-time video.

On the other hand, applications with low QoS (communication services with low QoS) include an application (hereinafter referred to simply as "HTTP" in some cases) in which HTTP (Hyper Text Transfer Protocol) is used, and an application (hereinafter referred to simply as "FTP" in some cases) in which FTP (File Transfer Protocol) is used.

The traffic models for VoIP, Game, Video, HTTP and FTP are shown in FIGS. 15 to 19, respectively.

In VoIP which is an application with high QoS, the allowable delay time is, for example, 100 ms, and the allowable error rate is, for example, $10^{-2}$, as shown in FIG. 14. In Game, the allowable delay time is, for example, 50 ms, and the allowable data error rate is, for example, $10^{-3}$. In Video, the allowable delay time is, for example, 150 ms, and the allowable data error rate is, for example, $10^{-3}$.

In HTTP and FTP which are applications with low QoS, on the other hand, the allowable delay time is, for example, 300 ms, and the allowable data error rate is, for example, $10^{-6}$.

Figure 15:
FIG. 15 is a graph showing a traffic model for VoIP.
Figure 16:
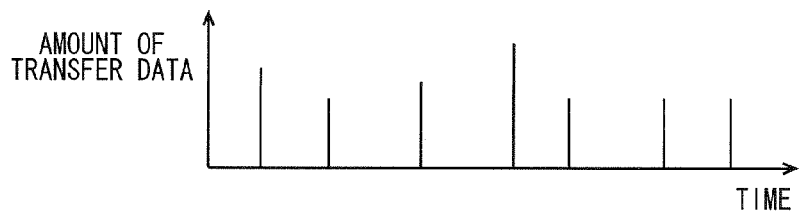
FIG. 16 is a graph showing a traffic model for Game.
Figure 17:
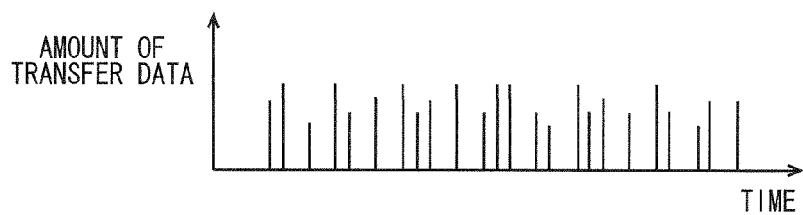
FIG. 17 is a graph showing a traffic model for Video.

As shown in FIG. 15, data transfer of data of approximately 40 bytes occurs, for example, once approximately every 20 ms in VoIP which is an application with high QoS. As shown in FIG. 16, data transfer of data of approximately 140 bytes occurs, for example, once approximately every 58 ms in Game. As shown FIG. 17, data transfer of data of approximately 50 bytes occurs, for example, once approximately every 12.5 ms in Video.

Figure 18:
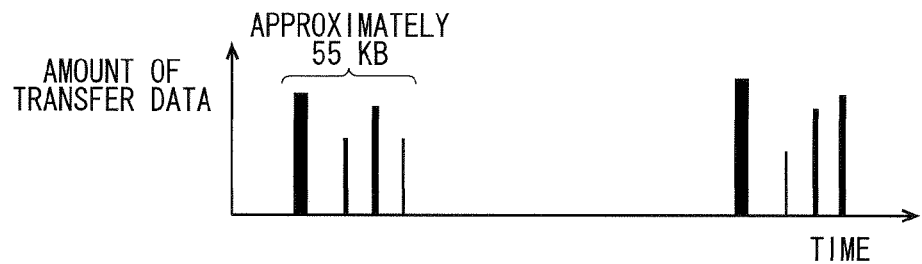
FIG. 18 is a graph showing a traffic model for HTTP.
Figure 19:
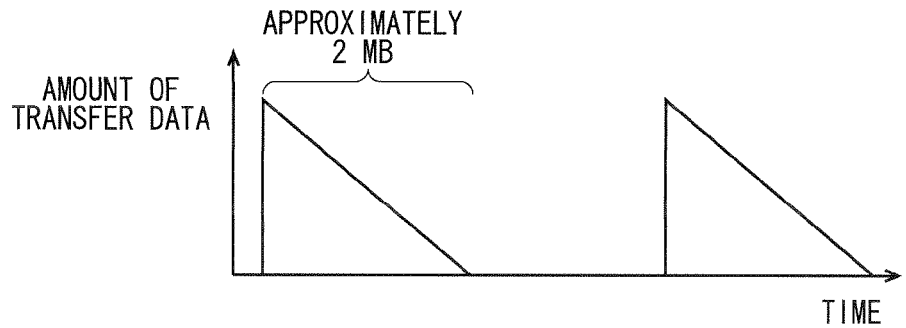
FIG. 19 is a graph showing a traffic model for FTP.

As shown in FIG. 18, data transfer of data of approximately 55 kilobytes occurs, for example, once approximately every 30 seconds in HTTP which is an application with low QoS. As shown in FIG. 19, data transfer of data of approximately 2 megabytes occurs, for example, once approximately every 3 minutes in FTP.

In this manner, the applications with high QoS such as VoIP, Game and Video are small in the amount of generated transfer data, short in allowable delay time of transfer data, and high in allowable error rate of transfer data. On the other hand, the applications with low QoS such as HTTP and FTP are large in the amount of generated transfer data, long in allowable delay time of transfer data, and low in allowable error rate of transfer data.

When the QoS pursuant to the application which a communication terminal 2 executes is higher than a threshold value, the grouping processing section 126 judges that the communication terminal 2 is executing an application which is small in the amount of generated transfer data, short in allowable delay time of transfer data, and high in allowable error rate of transfer data, to thereby distribute the communication terminal 2 into the first terminal group. When the QoS pursuant to the application which a communication terminal 2 executes is lower than the threshold value, the grouping processing section 126 judges that the communication terminal 2 is executing an application which is large in the amount of generated transfer data, long in allowable delay time of transfer data, and low in allowable error rate of transfer data, to thereby distribute the communication terminal 2 into the second terminal group. That is, the grouping processing section 126 classifies the plurality of communication terminals 2 with which the communication section 13 communicates (the plurality of communication terminals 2 connected to the base station 1) into the first terminal group which executes the applications which are small in the amount of generated transfer data, short in allowable delay time of transfer data, and high in allowable error rate of transfer data, and the second terminal group which executes the applications which are large in the amount of generated transfer data, long in allowable delay time of transfer data, and low in allowable error rate of transfer data. The first terminal group includes a communication terminal 2 which executes an application in which VoIP is used, a communication terminal 2 which executes an application for a real-time game, and a communication terminal 2 which executes an application for a real-time video. The second terminal group includes a communication terminal 2 which executes an application in which HTTP is used, and a communication terminal 2 which executes an application in which FTP is used.

An application which is small in the amount of generated transfer data, short in allowable delay time of transfer data, and high in allowable error rate of transfer data is hereinafter referred to as a "first application" in some cases. An application which is large in the amount of generated transfer data, long in allowable delay time of transfer data, and low in allowable error rate of transfer data is hereinafter referred to as a "second application" in some cases.

<Details of Method of Allocating Use Uplink Radio Resources for SRS>

In the present embodiment, the radio resource allocating section 122 allocates the use uplink radio resources for SRS from the third uplink radio resource 500c for SRS to the communication terminals 2 in the first terminal group to which the use downlink radio resources are to be allocated. Then, the radio resource allocating section 122 sets the transmission frequency bandwidth of the SRS transmitted from the communication terminals 2 in the first terminal group to which use downlink radio resources are to be allocated to 4 RBs. The "communication terminals 2 in the first terminal group" shall hereinafter mean the communication terminals 2 in the first terminal group to which the use downlink radio resources are to be allocated, and shall not include the communication terminals 2 in the first terminal group to which the use downlink radio resources are not to be allocated, unless otherwise specified.

On the other hand, the radio resource allocating section 122 allocates the use uplink radio resources for SRS from an uplink radio resource comprised of the first uplink radio resource 500a for SRS and the second uplink radio resource 500b for SRS to the communication terminals 2 in the second terminal group to which the use downlink radio resources are to be allocated.

Specifically, the radio resource allocating section 122 allocates the use uplink radio resources for SRS from an uplink radio resource of 20 RBs included in the second uplink radio resource 500b for SRS having a frequency bandwidth of 40 RBs to the communication terminals 2 in the low transmission capability terminal group which are included among the communication terminals 2 in the second terminal group to which the use downlink radio resources are to be allocated. Such an uplink radio resource of 20 RBs is referred to as an "uplink radio resource for a low transmission capability terminal" hereinafter. Then, the radio resource allocating section 122 allocates the use uplink radio resources for SRS from an uplink radio resource comprised of the first uplink radio resource 500a for SRS and part of the second uplink radio resource 500b for SRS other than the uplink radio resource for the low transmission capability terminal to the communication terminals 2 in the high transmission capability terminal group which are included among the communication terminals 2 in the second terminal group to which the use downlink radio resources are to be allocated. An uplink radio resource comprised of the first uplink radio resource 500a for SRS and part of the second uplink radio resource 500b for SRS other than the uplink radio resource for the low transmission capability terminal is referred to as an "uplink radio resource for a high transmission capability terminal" hereinafter.

The radio resource allocating section 122 also sets the transmission frequency bandwidth of the SRSs transmitted from the communication terminals 2 in the high transmission capability terminal group which are included among the communication terminals 2 in the second terminal group to which the use downlink radio resources are to be allocated to 20 RBs, and sets the transmission frequency bandwidth of the SRSs transmitted from the communication terminals 2 in the low transmission capability terminal group to 4 RBs. The "communication terminals 2 in the second terminal group" shall hereinafter mean the communication terminals 2 in the second terminal group to which the use downlink radio resources are to be allocated, and shall not include the communication terminals 2 in the second terminal group to which the use downlink radio resources are not to be allocated, unless otherwise specified.

The greater the transmission frequency bandwidth of the SRS is, the greater the transmission power required for a communication terminal 2 to transmit the SRS is. For this reason, if the transmission frequency bandwidth of the SRS transmitted from a communication terminal 2 having a low transmission capability is set to 20 RBs, there is a possibility that the communication terminal 2 is unable to appropriately transmit the SRS. In other words, there is a possibility that the base station 1 is unable to appropriately receive the SRS transmitted from the communication terminal 2.

To solve such a problem, the present embodiment is adapted to set the transmission frequency bandwidth of the SRS transmitted from a communication terminal 2 having a low transmission capability to the smallest bandwidth of the three bandwidths settable in the radio communications system 100, i.e. 4 RBs, to enable the base station 1 to appropriately receive the SRS transmitted from the communication terminal 2.

The radio resource allocating section 122 also sets the transmission frequency bandwidth of the SRS transmitted from a communication terminal 2 to which the use downlink radio resource is not to be allocated to 4 RBs.

An uplink radio resource which a communication terminal 2 in the first terminal group uses for the transmission of the SRS, i.e. the third uplink radio resource for SRS, is hereinafter referred to as an "uplink radio resource for a first terminal", and an uplink radio resource which a communication terminal 2 in the second terminal group uses for the transmission of the SRS, i.e. an uplink radio resource comprised of the first uplink radio resource 500a for SRS and the second uplink radio resource 500b for SRS, is hereinafter referred to as an "uplink radio resource for a second terminal" in some cases. The uplink radio resource for the second terminal is comprised of the uplink radio resource for the low transmission capability terminal and the uplink radio resource for the high transmission capability terminal.

In the aforementioned example of FIG. 11, the communication terminals 2 having the terminal numbers 1 to 8 are the communication terminals 2 in the second terminal group. Of the communication terminals 2 having the terminal numbers 1 to 8, the communication terminals 2 having the terminal numbers 1 to 3 are the communication terminals in the high transmission capability terminal group, and the communication terminals 2 having the terminal numbers 4 to 8 are the communication terminals in the low transmission capability terminal group. The communication terminals 2 having the terminal numbers 9 to 15 are the communication terminals 2 in the first terminal group. The use downlink radio resources are not allocated to the communication terminals 2 having the terminal numbers 16 to 18 to which the use uplink radio resources for SRS are allocated from the fourth uplink radio resource 500d for SRS.

As described above, the transmission frequency bandwidth of the SRSs for the communication terminals 2 in the first terminal group is set to 4 RBs, and the use uplink radio resources for SRS are allocated to the communication terminals 2 in the first terminal group from the uplink radio resource for the first terminal (the third uplink radio resource 500c for SRS) having the frequency bandwidth of 40 RBs. This enables a maximum of ten communication terminals 2 to transmit the SRSs using the uplink radio resource for the first terminal. That is, the number of communication terminals 2 capable of transmitting the SRSs using the uplink radio resource for the first terminal is ten.

On the other hand, the number of communication terminals 2 capable of transmitting the SRSs using the uplink radio resource for the second terminal is eight. The uplink radio resource for the high transmission capability terminal in the uplink radio resource for the second terminal is comprised of the first uplink radio resource 500a for SRS having the frequency bandwidth of 40 RBs and an uplink radio resource having the frequency bandwidth of 20 RBs in the second uplink radio resource 500b for SRS, and the transmission frequency bandwidth of the SRSs transmitted from the communication terminals 2 in the high transmission capability terminal group which are included among the communication terminals 2 in the second terminal group is set to 20 RBs. This enables a maximum of three communication terminals 2 (the communication terminals 2 having the terminal numbers 1 to 3 in the example of FIG. 11) to transmit the SRSs using the uplink radio resource for the high transmission capability terminal. Also, the uplink radio resource for the low transmission capability terminal in the uplink radio resource for the second terminal is comprised of an uplink radio resource having the frequency bandwidth of 20 RBs in the second uplink radio resource 500b for SRS, and the transmission frequency bandwidth of the SRSs transmitted from the communication terminals 2 in the low transmission capability terminal group which are included among the communication terminals 2 in the second terminal group is set to 4 RBs. This enables a maximum of five communication terminals 2 (the communication terminals 2 having the terminal numbers 4 to 8 in the example of FIG. 11) to transmit the SRSs using the uplink radio resource for the low transmission capability terminal. Thus, the number of communication terminals 2 capable of transmitting the SRSs using the uplink radio resource for the second terminal is eight.

Figure 20:
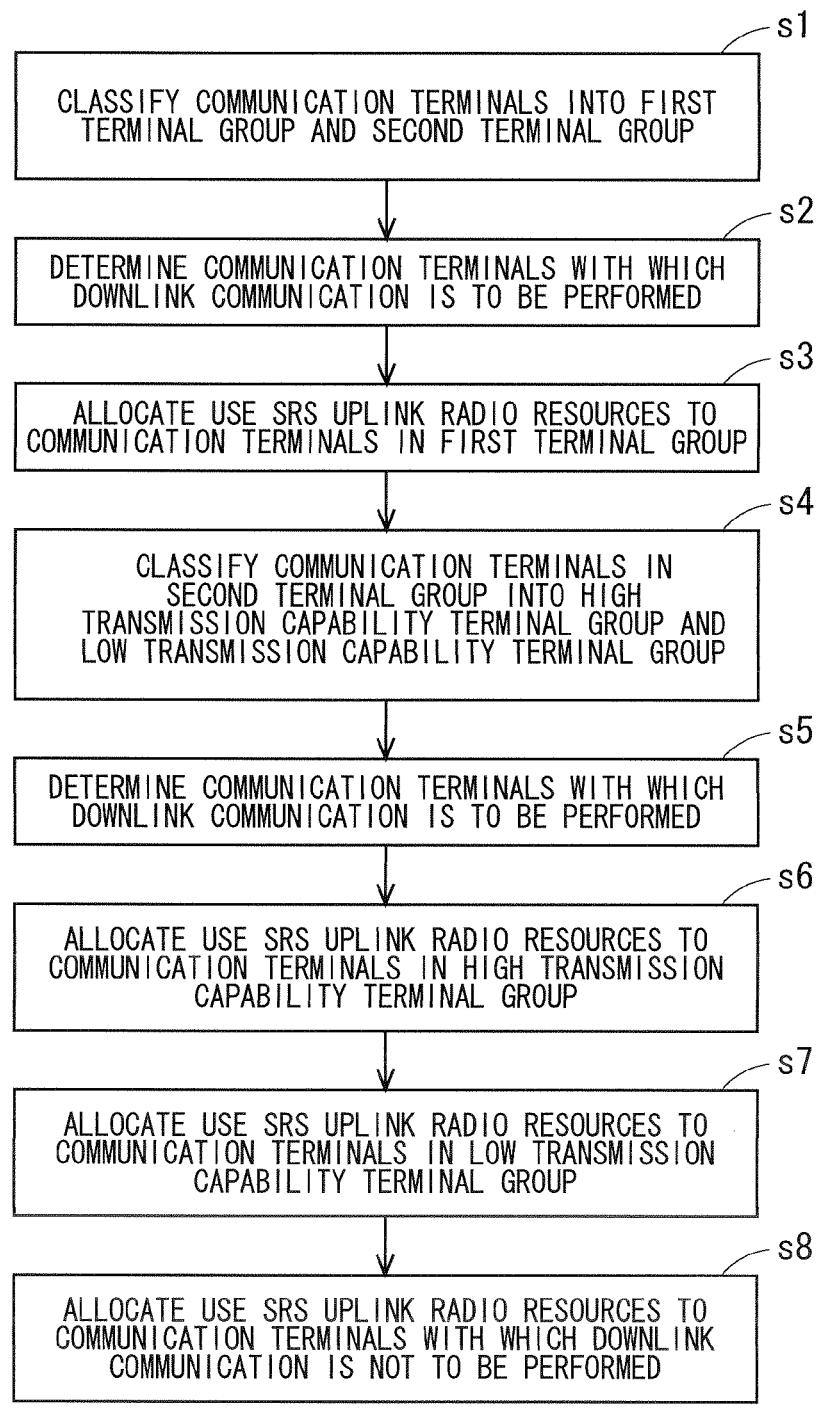
FIG. 20 is a flow diagram showing the operation of the base station according to the embodiment of the present invention.

Next, a series of operations of a base station 1 in the case where the use uplink radio resources for SRS are allocated to the communication terminals 2 connected to the base station 1 is described. FIG. 20 is a flow diagram showing such operations. The series of operations shown in FIG. 20 are performed each time a new communication terminal 2 connected to the base station 1 appears and each time a communication terminal 2 which is no longer connected to the base station 1 appears.

As shown in FIG. 20, the grouping processing section 126 classifies the plurality of communication terminals 2 connected to the base station 1 into the first terminal group and the second terminal group, based on the QoS thereof, in Step s1 in the aforementioned manner.

Next, in Step s2, the radio resource allocating section 122 determines the allocation priority (hereinafter referred to as a "downlink allocation priority" in some cases) of the use downlink radio resource for each of the communication terminals 2 in the first terminal group, based on the presence/ absence of the generation of transfer data, proportional fairness (PF), QoS and the like. Then, the radio resource allocating section 122 determines the communication terminals 2 in the first terminal group to which the use downlink radio resources are to be allocated, i.e. the communication terminals 2 in the first terminal group with which downlink communication is to be performed, based on the downlink allocation priority of each communication terminal 2 in the first terminal group.

Next, in Step s3, the radio resource allocating section 122 allocates the use uplink radio resource for SRS having the frequency bandwidth of 4 RBs from the uplink radio resource for the first terminal (the third uplink radio resource 500c for SRS) to each communication terminal 2 in the first terminal group to which the use downlink radio resource is to be allocated. Because the number of communication terminals 2 capable of transmitting the SRSs using the uplink radio resource for the first terminal is ten, the number of communication terminals 2 in the first terminal group to which the use downlink radio resources are allocated is ten or less.

Next, in Step s4, the grouping processing section 126 classifies the plurality of communication terminals 2 in the second terminal group into the high transmission capability terminal group and the low transmission capability terminal group in the aforementioned manner.

Next, in Step s5, the radio resource allocating section 122 determines the downlink allocation priority for each of the communication terminals 2 in the high transmission capability terminal group, based on the presence/absence of the generation of transfer data, proportional fairness (PF), QoS and the like. Then, the radio resource allocating section 122 determines the communication terminals 2 in the high transmission capability terminal group to which the use downlink radio resources are to be allocated, based on the downlink allocation priority of each communication terminal 2 in the high transmission capability terminal group. Likewise, the radio resource allocating section 122 determines the downlink allocation priority for each of the communication terminals 2 in the low transmission capability terminal group, based on the presence/absence of the generation of transfer data, proportional fairness (PF), QoS and the like. Then, the radio resource allocating section 122 determines the communication terminals 2 in the low transmission capability terminal group to which the use downlink radio resources are to be allocated, based on the downlink allocation priority of each communication terminal 2 in low transmission capability terminal group.

Next, in Step s6, the radio resource allocating section 122 allocates the use uplink radio resource for SRS having the frequency bandwidth of 20 RBs from the uplink radio resource for the high transmission capability terminal to each communication terminal 2 in the high transmission capability terminal group to which the use downlink radio resources are to be allocated. Because the number of communication terminals 2 capable of transmitting the SRSs using the uplink radio resource for the high transmission capability terminal is three, the number of communication terminals 2 in the high transmission capability terminal group to which the use downlink radio resources are to be allocated is three or less.

Next, in Step s7, the radio resource allocating section 122 allocates the use uplink radio resource for SRS having the frequency bandwidth of 4 RBs from the uplink radio resource for the low transmission capability terminal to each communication terminal 2 in the low transmission capability terminal group to which the use downlink radio resources are to be allocated. Because the number of communication terminals 2 capable of transmitting the SRSs using the uplink radio resource for the low transmission capability terminal is five, the number of communication terminals 2 in the low transmission capability terminal group to which the use downlink radio resources are to be allocated is five or less.

Next, in Step s8, the radio resource allocating section 122 allocates the use uplink radio resource for SRS having the frequency bandwidth of 4 RBs from the fourth uplink radio resource 500d for SRS to each communication terminal 2 to which the use downlink radio resources are not to be allocated.

In the base station 1, the use uplink radio resources for SRS are allocated to the communication terminals 2 connected to the base station 1 in the aforementioned manner.

In the base station 1, the downlink allocation priority of each of the communication terminals 2 in the first terminal group is updated. In the base station 1, the communication terminals 2 in the first terminal group to which the use downlink radio resources are to be allocated are re-determined, based on the updated downlink allocation priorities. In the base station 1, the use uplink radio resources for SRS are allocated to the re-determined communication terminals 2 in the first terminal group to which the use downlink radio resources are to be allocated. Such a process is performed at regular time intervals in the base station 1. The same holds true for the communication terminals 2 in the high transmission capability terminal group and for the communication terminals 2 in the low transmission capability terminal group.

In the aforementioned manner, the number (ten) of communication terminals 2 capable of transmitting the SRSs using the uplink radio resource for the first terminal used by the communication terminals 2 in the first terminal group executing an application which is short in allowable delay time of transfer data such as VoIP, Game and Video is greater than the number (eight) of communication terminals 2 capable of transmitting the SRSs using the uplink radio resource for the second terminal used by the communication terminals 2 in the second terminal group executing an application which is long in allowable delay time of transfer data such as HTTP and FTP in the present embodiment. This allows a greater number of communication terminals 2 executing an application which is short in allowable delay time of transfer data to transmit the SRSs. Thus, it is not necessary to replace the communication terminals 2 caused to transmit the SRSs even when a large number of communication terminals 2 execute an application which is short in allowable delay time of transfer data. As a result, the occurrence of a delay in data transfer based on the replacement of the communication terminals 2 caused to transmit the SRSs is suppressed. This reduces the delay in data transfer to the communication terminals 2 executing an application which is short in allowable delay time of transfer data. As a result, the base station 1 easily satisfies the allowable delay time of transfer data required in the applications executed by the communication terminals 2. This improves the performance of the base station 1. This will be described in detail.

FIG. 21 is a diagram showing the operation of a base station 1 in the case where the base station 1 allocates the use uplink radio resources for SRS having a frequency bandwidth of 20 RBs from the uplink radio resource for the first terminal to the communication terminals 2 in the first terminal group, unlike the present embodiment. Such a base station 1 is referred to as a "comparable base station 1" hereinafter. In the example of FIG. 21, the communication terminals 2 having the terminal numbers 9 to 11 in the first terminal group are connected to the comparable base station 1.

For the comparable base station 1, the number of communication terminals 2 capable of transmitting the SRSs using the uplink radio resource for the first terminal is two because the use uplink radio resource for SRS having a frequency bandwidth of 20 RBs is allocated to the communication terminals 2 in the first terminal group. Thus, the number of communication terminals 2 capable of transmitting the SRSs using the uplink radio resource for the first terminal is less than the number (eight) of communication terminals 2 capable of transmitting the SRSs using the uplink radio resource for the second terminal.

Consideration will be given to an instance where the comparable base station 1 performs downlink communication with the communication terminals 2 having the terminal numbers 9 and 10 which transmit the SRSs using the uplink radio resource for the first terminal, and does not perform downlink communication with the communication terminal 2 having the terminal number 11. In this instance, consideration will be given to an instance where transfer data to the communication terminal 2 having the terminal number 11 occurs in the ninth sub-frame 302 (the diagonally shaded sub-frame 302) in the (N−2)th TDD frame 300 and where the downlink allocation priority of the communication terminal 2 having the terminal number 11 is lower than that of the communication terminal 2 having the terminal number 9 but is higher than that of the communication terminal 2 having the terminal number 10.

In such an instance, the use downlink radio resources are allocated to the communication terminals 2 having the terminal numbers 9 and 11, but the use downlink radio resource is not allocated to the communication terminal 2 having the terminal number 10. Thus, the use uplink radio resources for SRS are allocated from the uplink radio resource for the first terminal to the communication terminals 2 having the terminal numbers 9 and 11, and the use uplink radio resource for SRS is allocated from the fourth uplink radio resource 500*d* for SRS to the communication terminal 2 having the terminal number 10.

The comparable base station 1 transmits the SRS control data for providing notification about the use uplink radio resources for SRS allocated to the communication terminals 2 having the terminal numbers 9 and 11 and the use uplink radio resource for SRS allocated to the communication terminal 2 having the terminal number 10 in the ninth sub-frame 302 in the (N−2)th TDD frame 300, as shown in FIG. 21. Then, each of the communication terminals 2 having the terminal numbers 9 to 11 transmits a response signal in the seventh sub-frame 302 in the (N−1)th TDD frame 300. Thereafter, each of the communication terminals 2 having the terminal numbers 9 to 11 transmits the SRS using the use uplink radio resource for SRS allocated thereto by the comparable base station 1 in the first sub-frame 302 in the N-th TDD frame 300. In the sixth sub-frame 302 in the N-th TDD frame 300, the comparable base station 1 then starts performing downlink communication with the communication terminal 2 having the terminal number 11 to which the transfer data has occurred in the ninth sub-frame 302 in the (N−2)th TDD frame 300.

In this manner, the number of communication terminals 2 capable of transmitting the SRSs using the uplink radio resource for the first terminal is two in the comparable base station 1. Thus, when three or more communication terminals 2 in the first terminal group are connected to the comparable base station 1 as in the example of FIG. 21, it is necessary to replace the communication terminals 2 transmitting the SRSs in the case of causing the third and subsequent communication terminals 2 in the first terminal group to transmit the SRSs. As mentioned above, the replacement of the communication terminals 2 transmitting the SRSs (the replacement of the communication terminal 2 having the terminal number 10 with the communication terminal 2 having the terminal number 11 in the example of FIG. 21) is completed not less than 10 ms after the transmission of the SRS control data and cannot be made immediately. Thus, even if the SRS control data is transmitted as soon as the transfer data to a communication terminal 2 in the first terminal group to which the use downlink radio resource is not allocated occurs, data transmission to the communication terminal 2 is done not less than 10 ms after (in the sixth sub-frame 302 in the N-th TDD frame 300 in the example of FIG. 21). Thus, a delay occurs in the data transfer to the communication terminal 2. Because a communication terminal 2 in the first terminal group executes an application which is short in allowable delay time of transfer data, a delay in the data transfer to the communication terminal 2 makes it difficult to satisfy the allowable delay time required for the application executed by the communication terminal 2. That is, the increase in the number of communication terminals 2 in the first terminal group makes the replacement of the communication terminals 2 transmitting the SRSs more prone to occur in the comparable base station 1. A delay in data transfer based on this replacement makes it difficult to satisfy the allowable delay time of the transfer data required for the applications executed by the communication terminals 2 in the first terminal group. As a result, there is a possibility that the performance of the base station 1 is degraded.

In the base station 1 according to the present embodiment, on the other hand, the number of communication terminals 2 capable of transmitting the SRSs using the uplink radio resource for the first terminal used by the communication terminals 2 in the first terminal group is as many as ten. Thus, the base station 1 according to the present embodiment is able to transmit the SRSs to more communication terminals 2 in the first terminal group executing the applications which are short in allowable delay time of transfer data. This decreases the possibility of replacing the communication terminals 2 caused to transmit the SRSs even if there are many communication terminals 2 executing the applications which are short in allowable delay time of transfer data. As a result, the occurrence of a delay in data transfer based on the replacement of the communication terminals 2 transmitting the SRSs is suppressed. This reduces the delay in data transfer to the communication terminals 2 executing the applications which are short in allowable delay time of transfer data. As a result, the base station 1 easily satisfies the allowable delay time of transfer data required in the applications executed by the communication terminals 2. This improves the performance of the base station 1.

Although the SRSs are not multiplexed in the same frequency band in the present embodiment, the SRSs transmitted from the plurality of communication terminals 2 in the first terminal group may be multiplexed in the same frequency band. In this case, the number of communication terminals 2 capable of transmitting the SRSs using the uplink radio resource for the first terminal used by the communication terminals 2 in the first terminal group is further increased to 80 (10×8). This further decreases the possibility of replacing the communication terminals 2 caused to transmit the SRSs. Thus, the base station 1 more easily satisfies the allowable delay time of transfer data required in the applications executed by the communication terminals 2. As a result, this further improves the performance of the base station 1.

In the base station 1 according to the present embodiment, the transmission frequency bandwidth (4 RBs) of the SRSs transmitted from the communication terminals 2 in the first terminal group executing the applications which are small in the amount of transfer data is less than the transmission frequency bandwidth (20 RBs) of the SRSs transmitted from the communication terminals 2 in the high transmission capability terminal group which are included among the communication terminals 2 in the second terminal group executing the applications which are large in the amount of transfer data. This allows the decrease in the frequency band not used for the data transmission to a communication terminal 2 in the transmission frequency band of the SRS transmitted from the communication terminal 2 in the first terminal group executing the applications which are small in the amount of transfer data.

As illustrated above with reference to FIGS. 15 to 17, only transfer data in the range of tens of bytes to hundreds of bytes is generated once every hundreds of milliseconds in the applications including VoIP, Game and Video. If the transmission frequency bandwidth of the SRS transmitted from a communication terminal 2 in the first terminal group executing the application which is small in the amount of transfer data is 20 RBs as in the aforementioned example of FIG. 21, the greater part of the transmission frequency band of the SRS transmitted from the communication terminal 2 is not used for the downlink communication between the communication terminal 2 and the base station 1. In other words, as shown in FIG. 22, only a very small part of a downlink radio resource 810 including a transmission frequency band 800 of the SRS transmitted from a communication terminal 2 (the communication terminal 2 having the terminal number 9 in FIG. 22) in the first terminal group in the frequency direction in the third downlink sub-frame 302c is allocated to the communication terminal 2 as a use downlink radio resource 820. Thus, the greater part of the downlink radio resource 810 is not used for the downlink communication between the communication terminal 2 and the base station 1. Part of the downlink radio resource 810 including the transmission frequency band 800 of the SRS transmitted from a communication terminal 2 in the first terminal group in the frequency direction in the third downlink sub-frame 302c which is not used for the downlink communication between the communication terminal 2 and the base station 1 is referred to hereinafter as a "downlink communication not-in-use region" in some cases.

In this manner, when the transmission frequency bandwidth of the SRS transmitted from a communication terminal 2 in the first terminal group executing the application which is small in the amount of transfer data is large, part of the transmission frequency band 800 of the SRS transmitted from the communication terminal 2 which is not used for the downlink communication between the communication terminal 2 and the base station 1 becomes large. In other words, the downlink communication not-in-use region in the downlink radio resource 810 including the transmission frequency band 800 transmitted from the communication terminal 2 in the frequency direction becomes large in the third downlink sub-frame 302c. When such a large downlink communication not-in-use region is not used for the downlink communication between other communication terminals 2 and the base station 1 but remains unallocated, the transmission throughput of the base station 1 is lowered. On the other hand, when such a large downlink communication not-in-use region is used for the downlink communication between a second communication terminal 2 and the base station 1, the large SRS non-corresponding use downlink radio resource is allocated to the second communication terminal 2. As mentioned above, the null steering is not appropriately performed when the SRS non-corresponding use downlink radio resource is allocated to a communication terminal 2. For this reason, the SRS non-corresponding use downlink radio resource is allocated to a communication terminal 2 is large in amount, interference with the surroundings and interference from the surroundings are liable to occur. Thus, the performance of the base station is degraded.

On the other hand, the transmission frequency bandwidth of the SRS transmitted from a communication terminal 2 in the first terminal group executing the application which is small in the amount of transfer data is small in the present embodiment. For this reason, a frequency band which is not used for the data transmission to the communication terminal 2 in the transmission frequency band of the SRS transmitted from the communication terminal 2 is made smaller. In other words, the downlink communication not-in-use region in the downlink radio resource 810 including the transmission frequency band 800 transmitted from the communication terminal 2 in the frequency direction becomes small in the third downlink sub-frame 302c. Even when the downlink communication not-in-use region is not used for the downlink communication between other communication terminals 2 and the base station 1 but remains unallocated, the lowering of the transmission throughput of the base station 1 is suppressed. Also, even when the downlink communication not-in-use region is used for the downlink communication between a second communication terminal 2 and the base station 1, the SRS non-corresponding use downlink radio resource allocated to the second communication terminal 2 is reduced in amounts. For this reason, interference with the surroundings and interference from the surroundings are less liable to occur in the base station 1. As a result, the performance of the base station is improved.

<About Allocation of SRS Non-Corresponding Use Downlink Radio Resources to Communication Terminals>

FIG. 23 is a diagram showing an example of the allocation of the use downlink radio resources to the communication terminals 2 having the terminal numbers 1 to 14 in the target unit period 360.

In the present embodiment, there are cases where the radio resource allocating section 122 allocates the SRS corresponding use downlink radio resources and the SRS non-corresponding use downlink radio resources to the communication terminals 2 in the first terminal group having a high allowable error rate of transfer data. On the other hand, the radio resource allocating section 122 allocates only the SRS corresponding use downlink radio resources to the communication terminals 2 in the second terminal group having a low allowable error rate of transfer data.

In the example of FIG. 23, only the SRS corresponding use downlink radio resources are allocated to the communication terminals 2 having the terminal numbers 1 to 8 in the second terminal group.

On the other hand, not only an SRS corresponding use downlink radio resource 900a but also an SRS non-corresponding use downlink radio resource 900b is allocated to the communication terminal 2 having the terminal number 9 in the first terminal group. Also, not only an SRS corresponding use downlink radio resource 910a but also an SRS non-corresponding use downlink radio resource 910b including the SRS untransmittable band 460 in the frequency direction is allocated to communication terminal 2 having the terminal number 14 in the first terminal group. Only the SRS corresponding use downlink radio resources are allocated to the communication terminals 2 having the terminal numbers 10, 11, 12 and 13 in the first terminal group.

In this manner, there are cases where the SRS corresponding use downlink radio resources and the SRS non-corresponding use downlink radio resources are allocated to the communication terminals 2 in the first terminal group having a high allowable error rate of transfer data in the present embodiment. On the other hand, only the SRS corresponding use downlink radio resources are allocated to the communication terminals 2 in the second terminal group having a low allowable error rate of transfer data.

When the SRS non-corresponding use downlink radio resource is allocated to a communication terminal 2, interference from the surroundings is liable to occur during the downlink communication between the communication terminal 2 and the base station 1, as mentioned above. Accordingly, it is difficult for the communication terminal 2 to receive the transfer data from the base station 1, resulting in the increase in error rate of transfer data. The present embodiment, in which only the SRS corresponding use downlink radio resource is allocated to the communication terminal 2 in the second terminal group having a low allowable error rate of transfer data, reduces the error rate of transfer data in the communication terminal 2. This makes it easy to satisfy the allowable error rate required in the application executed by the communication terminal 2. As a result, the performance of the base station is improved.

On the other hand, there are cases where the SRS non-corresponding use downlink radio resource is allocated to a communication terminal 2 in the first terminal group. However, the communication terminal 2 in the first terminal group executes an application which is high in allowable error rate of transfer data. Thus, when the error rate of the transfer data in the communication terminal 2 becomes more or less high because of the use of the SRS non-corresponding use downlink radio resource for the downlink communication between the communication terminal 2 and the base station 1, the allowable error rate required in the application executed by the communication terminal 2 is satisfied. When the base station 1 allocates the SRS corresponding use downlink radio resource and the SRS non-corresponding use downlink radio resource to a communication terminal 2 for the purpose of improving the throughput of the downlink communication with the communication terminal 2 in the first terminal group, the allowable error rate required in the application executed by the communication terminal 2 is satisfied. As a result, the performance of the base station is improved.

In the example of FIG. 22, the downlink communication not-in-use region in the downlink radio resource 810 including the transmission frequency band 800 of the SRS transmitted from a communication terminal 2 in the first terminal group in the frequency direction in the third downlink sub-frame 302c may be allocated as the SRS non-corresponding use downlink radio resource to another communication terminal 2 in the first terminal group which is different from the aforementioned communication terminal 2.

The multiplexing of the SRSs transmitted from a plurality of communication terminals 2 in the same frequency band causes the communication terminals 2 to be liable to suffer interference from the surroundings. As a result, the error rate of the transfer data is increased in the plurality of communication terminals 2. It is therefore desirable that the SRSs from the plurality of communication terminals 2 in the second terminal group executing the applications which are low in allowable error rate of transfer data are not multiplexed at the same frequency. The reason why the multiplexing of the SRSs transmitted from a plurality of communication terminals 2 in the same frequency band causes the communication terminals 2 to be liable to suffer interference from the surroundings will be described.

FIG. 24 is a diagram showing an example of the allocation of the use downlink radio resources to the communication terminals 2. In the example of FIG. 24, the SRSs transmitted from the communication terminals 2 having the terminal numbers 1 to 3 in the second terminal group are multiplexed.

As shown in FIG. 24, even when the SRSs transmitted from the communication terminals 2 having the terminal numbers 1 to 3 are multiplexed in the target unit period 360, it is impossible to transmit signals to all of the communication terminals 2 having the terminal numbers 1 to 3 using the same frequency band in the first downlink sub-frame 302a in the target unit period 360. In other words, if an attempt is made to transmit signals to all of the communication terminals 2 having the terminal numbers 1 to 3 in the first downlink sub-frame 302a, the transmission signals to the communication terminals 2 having the terminal numbers 1 to 3 are transmitted in frequency bands different from each other.

On the other hand, when a communication terminal 2 in the second terminal group communicating with a neighboring base station 1, e.g. the communication terminal 2 having the terminal number 50, transmits the SRS using the uplink radio resource identical with the uplink radio resource which the communication terminals 2 having the terminal numbers 1 to 3 communicating with a base station 1 use for the transmission of the SRSs, the neighboring base station 1 receives the SRS from the communication terminal 2 having the terminal number 50 while suffering interference from the SRSs transmitted from the communication terminals 2 having the terminal numbers 1 to 3. In this case, all of the communication terminals 2 having the terminal numbers 1 to 3 communicating with the base station 1 are targets toward which nulls are directed in the neighboring base station 1.

Attention is given to a specific frequency band included in the transmission frequency band of the SRSs transmitted from the terminal numbers 1 to 3. This specific frequency band is referred to as a "frequency band of interest". In the frequency band of interest, the signal is transmitted from the base station 1 to only one of the communication terminals 2 having the terminal numbers 1 to 3. Thus, the communication terminal 2 having the terminal number 50 communicating with the neighboring base station 1 receives only the signal from one of the communication terminals 2 having the terminal numbers 1 to 3 in the frequency band of interest. Thus, there is little need for the neighboring base station 1 to direct nulls toward all of the communication terminals 2 having the terminal numbers 1 to 3 in the frequency band of interest. Nevertheless, all of the communication terminals 2 having the terminal numbers 1 to 3 are the targets toward which nulls are directed in the neighboring base station 1.

The number of nulls settable in the null steering related to the transmission directivity of the array antenna 110 depends on the number of antennas 110a constituting the array antenna 110. Specifically, when the number of antennas is M, the maximum number of settable nulls is (M−1). When the number of targets toward which nulls are directed is increased in the base station 1, it is impossible to direct the nulls toward all of the targets.

As mentioned above, when the SRSs transmitted from the communication terminals 2 having the terminal numbers 1 to 3 are multiplexed, all of the communication terminals 2 having the terminal numbers 1 to 3 become the targets toward which the nulls are directed although the number of communication terminals 2 toward which the nulls are required to be directed among the communication terminals 2 having the terminal numbers 1 to 3 is only one. When another target toward which the nulls are directed is present in the neighboring base station 1, the possibility that the nulls are not directed toward one of the communication terminals 2 having the terminal numbers 1 to 3 toward which the nulls are required to be directed is increased. Thus, the communication terminals 2 having the terminal numbers 1 to 3 in which the SRSs are multiplexed are liable to suffer interference from the surroundings.

In this manner, when the SRSs transmitted from a plurality of communication terminals 2 are multiplexed in the same frequency band, the plurality of communication terminals 2 are liable to suffer interference from the surroundings. It is therefore desirable that the SRSs from a plurality of communication terminals 2 in the second terminal group executing the applications which are low in allowable error rate of transfer data are not multiplexed at the same frequency.

In the aforementioned description, the uplink radio resource for the first terminal which a communication terminal 2 in the first terminal group uses for the transmission of the SRS is the third uplink radio resource 500c for SRS, and the uplink radio resource for the second terminal which a communication terminal 2 in the second terminal group uses for the transmission of the SRS is the uplink radio resource comprised of the first uplink radio resource 500a for SRS and the second uplink radio resource 500b for SRS. However, the combination of the uplink radio resource for the first terminal and the uplink radio resource for the second terminal may be of other forms.

For example, the uplink radio resource for the first terminal may be an uplink radio resource comprised of the second uplink radio resource 500b for SRS and the third uplink radio resource 500c for SRS, and the uplink radio resource for the second terminal may be the first uplink radio resource 500a for SRS.

The form of the combination of the uplink radio resource for the first terminal and the uplink radio resource for the second terminal may be changed. For example, the form of the combination of the uplink radio resource for the first terminal and the uplink radio resource for the second terminal may be changed depending on time periods.

Specifically, when the number of communication terminals 2 in the first terminal group is small and the number of communication terminals 2 in the second terminal group is large in a first time period, the uplink radio resource for the first terminal is the third uplink radio resource 500c for SRS, and the uplink radio resource for the second terminal is the uplink radio resource comprised of the first uplink radio resource 500a for SRS and the second uplink radio resource 500b for SRS in the first time period. Also, when the number of communication terminals 2 in the first terminal group is large and the number of communication terminals 2 in the second terminal group is small in a second time period, the uplink radio resource for the first terminal is the uplink radio resource comprised of the second uplink radio resource 500b for SRS and the third uplink radio resource 500c for SRS, and the uplink radio resource for the second terminal is the first uplink radio resource 500a for SRS in the second time period.

In this manner, appropriately changing the form of the combination of the uplink radio resource for the first terminal and the uplink radio resource for the second terminal further improves the performance of the base station 1.

Although the present invention is applied to LTE in the aforementioned example, the present invention may be applied to other radio communications systems.

While the invention has been described in detail, the foregoing description is in all aspects illustrative and not restrictive. It is understood that numerous other modifications and variations which have not been illustrated can be devised without departing from the scope of the invention.

REFERENCE SIGNS LIST 1, 1a, 1b Base stations
2 Communication terminals
13 Communication section
110a Antennas
122 Radio resource allocating section
126 Grouping processing section

The invention claimed is:

1. A base station comprising:
a communication section for performing communication using a plurality of antennas, said communication section controlling the transmission directivity of the plurality of antennas, based on a known signal transmitted from a communication terminal, when performing downlink communication;
a radio resource allocating section for allocating a downlink radio resource used for the transmission of a signal to a communication terminal by said communication section to the communication terminal and for allocating an uplink radio resource used for the transmission of the known signal by a communication terminal to the communication terminal; and
a grouping processing section for classifying a plurality of communication terminals with which said communication section communicates into a first terminal group executing an application with high communication quality of transfer data and a second terminal group executing an application with low communication quality of transfer data,
wherein a unit period is determined in which an uplink radio resource for a-known signal usable for the transmission of said known signal by a communication terminal and a downlink radio resource appear, and
wherein a correspondence between the downlink radio resource and said uplink radio resource for said known signal is defined for null steering based on said known signal in said unit period.

2. The base station according to claim 1,
wherein known signals from a plurality of communication terminals in said first terminal group are multiplexed in the same frequency band.

3. The base station according to claim 1,
wherein a plurality of bandwidths different in size from each other are determined as a bandwidth settable as the transmission frequency bandwidth of said known signal, and
wherein the smallest one of the plurality of bandwidths is set as the transmission frequency bandwidth of a known signal transmitted from a communion terminal in said first terminal group.

4. The base station according to claim 1,
wherein said first terminal group includes a communication terminal executing an application in which VoIP (Voice over Internet Protocol) is used, a communication terminal executing an application for a real-time game, and a communication terminal executing an application for a real-time video, and
wherein said second terminal group includes a communication terminal executing an application in which HTTP (HyperText Transfer Protocol) is used, and a communication terminal executing an application in which FTP (File Transfer Protocol) is used.

5. The base station according to claim 1,
wherein said grouping processing section for classifying classifies a plurality of communication terminals with which said communication section communicates into said first terminal group executing an application which is small in the amount of transfer data and said second terminal group executing an application which is large in the amount of transfer data, and wherein said radio resource allocating section makes the transmission frequency bandwidth of said known signal transmitted from a communication terminal in said first terminal group smaller than the transmission frequency bandwidth of said known signal transmitted from a communication terminal in said second terminal group.

6. The base station according to claim 5,
wherein a plurality of bandwidths different in size from each other are determined as a bandwidth settable as the transmission frequency bandwidth of said known signal, and
wherein the smallest one of the plurality of bandwidths is set as the transmission frequency bandwidth of said known signal transmitted from a communion terminal in said first terminal group.

7. The base station according to claim 5,
wherein said first terminal group includes a communication terminal executing an application in which VoIP (Voice over Internet Protocol) is used, a communication terminal executing an application for a real-time game, and a communication terminal executing an application for a real-time video, and
wherein said second terminal group includes a communication terminal executing an application in which HTTP (HyperText Transfer Protocol) is used, and a communication terminal executing an application in which FTP (File Transfer Protocol) is used.

8. The base station according to claim 1,
wherein said grouping processing section for classifying classifies a plurality of communication terminals with which said communication section communicates into said first terminal group executing an application which is high in allowable error rate of transfer data and said second terminal group executing an application which is low in allowable error rate of transfer data,
wherein said radio resource allocating section sometimes allocates a corresponding downlink radio resource brought into correspondence with an uplink radio resource which a communication terminal in said first terminal group uses for the transmission of said known signal and a non-corresponding downlink radio resource not brought into correspondence with the uplink radio resource to the communication terminal, and
wherein said radio resource allocating section allocates only a downlink radio resource brought into correspondence with an uplink radio resource which a communication terminal in said second terminal group uses for the transmission of said known signal to the communication terminal.

9. The base station according to claim 8,
wherein known signals from a plurality of communication terminals in said second terminal group are not multiplexed in the same frequency band.

10. The base station according to claim 8,
wherein said first terminal group includes a communication terminal executing an application in which VoIP (Voice over Internet Protocol) is used, a communication terminal executing an application for a real-time game, and a communication terminal executing an application for a real-time video, and
wherein said second terminal group includes a communication terminal executing an application in which HTTP (HyperText Transfer Protocol) is used, and a communication terminal executing an application in which FTP (File Transfer Protocol) is used.

11. The base station according to claim 1,
wherein said grouping processing section for classifying classifies a plurality of communication terminals with which said communication section communicates into said first terminal group executing an application which is short in allowable delay time of transfer data and said second terminal group executing an application which is long in allowable delay time of transfer data,
wherein said uplink radio resource for said known signal includes an uplink radio resource for a first terminal used by said first terminal group and an uplink radio resource for a second terminal used by said second terminal group, and
wherein the number of communication terminals in said first terminal group capable of transmitting said known signal using said uplink radio resource for said first terminal is greater than the number of communication terminals in said second terminal group capable of transmitting said known signal using said uplink radio resource for said second terminal in said unit period.

12. A method of communication control in a base station communicating with a communication terminal, said method comprising the steps of:
(a) performing communication using a plurality of antennas, and controlling the transmission directivity of the plurality of antennas, based on a known signal transmitted from a communication terminal, when performing downlink communication;
(b) allocating a downlink radio resource used for the transmission of a signal to a communication terminal in said step (a) to the communication terminal, and allocating an uplink radio resource used for the transmission of the known signal by a communication terminal to the communication terminal; and
(c) classifying a plurality of communication terminals with which communication is performed in said step (a) into a first terminal group executing an application with high communication quality of transfer data and a second terminal group executing an application with low communication quality of transfer data,
wherein a unit period is determined in which an uplink radio resource for said known signal usable for the transmission of said known signal by a communication terminal and a downlink radio resource appear, and
wherein a correspondence between the downlink radio resource and said uplink radio resource for said known signal is defined for null steering based on said known signal in said unit period.

13. The method of communication control according to claim 12,
wherein, in said step (c), a plurality of communication terminals with which communication is performed in said step (a) are classified into said first terminal group executing an application which is small in the amount of transfer data and said second terminal group executing an application which is large in the amount of transfer data, and
wherein the transmission frequency bandwidth of said known signal transmitted from a communication terminal in said first terminal group is made smaller than the transmission frequency bandwidth of said known signal transmitted from a communication terminal in said second terminal group in said step (b).

14. The method of communication control according to claim 12,
wherein, in said step (c), a plurality of communication terminals with which communication is performed in said step (a) are classified into said first terminal group executing an application which is high in allowable error rate of transfer data and said second terminal group executing an application which is low in allowable error rate of transfer data, wherein a corresponding downlink radio resource brought into correspondence with an uplink radio resource which a communication terminal in said first terminal group uses for the transmission of said known signal and a non-corresponding downlink radio resource not brought into correspondence with the uplink radio resource are sometimes allocated to the communication terminal in said step (b), and wherein only a downlink radio resource brought into correspondence with an uplink radio resource which a communication terminal in said second terminal group uses for the transmission of said known signal is allocated to the communication terminal in said step (b).

15. The method of communication control according to claim 12, wherein, in said step (c), a plurality of communication terminals with which communication is performed in said step (a) are classified into said first terminal group executing an application which is short in allowable delay time of transfer data and said second terminal group executing an application which is long in allowable delay time of transfer data, wherein said uplink radio resource for said known signal includes an uplink radio resource for a first terminal used by said first terminal group and a uplink radio resource for a second terminal used by said second terminal group, and wherein the number of communication terminals in said first terminal group capable of transmitting said known signal using said uplink radio resource for said first terminal is greater than the number of communication terminals in said second terminal group capable of transmitting said known signal using said uplink radio resource for said second terminal in said unit period.

\* \* \* \* \*